United States Patent [19]

Klinner

[11] Patent Number: 4,951,451
[45] Date of Patent: Aug. 28, 1990

[54] APPARATUS AND METHOD FOR HARVESTING CROPS BY STRIPPING

[76] Inventor: Wilfred E. Klinner, Beechwood, Heath Lane, Aspley Heath, Woburn Sands, Milton Keynes, Buckinghamshire MK17 8TN, United Kingdom

[21] Appl. No.: 382,708
[22] PCT Filed: Feb. 1, 1988
[86] PCT No.: PCT/GB88/00060
§ 371 Date: Aug. 7, 1989
§ 102(e) Date: Aug. 7, 1989
[87] PCT Pub. No.: WO88/05626
PCT Pub. Date: Aug. 11, 1988

[30] Foreign Application Priority Data

Feb. 5, 1987 [GB] United Kingdom ................. 8702627
Apr. 2, 1987 [GB] United Kingdom ................. 8707822
Jun. 4, 1987 [GB] United Kingdom ................. 8713132

[51] Int. Cl.⁵ .......................................... A01D 41/06
[52] U.S. Cl. ..................................... 56/16.5; 56/16.6; 56/122; 56/128; 56/222; 460/140
[58] Field of Search .................. 56/16.4–16.6, 56/122, 126, 127, 128, 130, 220, 222, 13.2; 460/134, 140

[56] References Cited

U.S. PATENT DOCUMENTS 1,379,112 5/1921 Luedke .
1,604,458 10/1926 Luedke .
2,910,819 11/1959 Helliwell ............................ 56/220
3,184,904 5/1965 Fiedler .
4,276,738 7/1981 Ferraro ............................. 56/130
4,587,799 5/1986 Thomas et al. ................ 56/16.5 X

FOREIGN PATENT DOCUMENTS 2003770 3/1972 Australia .
915758 11/1946 France .
994505 11/1951 France .
WO86/01972 4/1986 PCT Int'l Appl. .

Primary Examiner—George A. Suchfield
Attorney, Agent, or Firm—Collard, Roe & Galgano

[57] ABSTRACT

The apparatus for harvesting crops, particularly seed crops, comprises a mobile support structure (20) and a crop stripping device in the form of a rotor (30), which may be attached to height adjustable arms and is driven by drive means (22). The rotor (30) carries transverse rows of crop stripping elements (1) which may be combined with transverse ribs. The crop stripping elements have prominent leading edges, for example each formed at the junction between two faces which are acutely inclined with respect to each other. The drive to the rotor is so arranged that during forward movement of the apparatus the crop engaging elements (32) are propelled progressively through the crop, moving upwards at the front region. Seeds and other plant parts detached by the action of the rotor are impelled into a crop flow passage (27) under a crop guide cover (21). A transverse auger (83) transfers the detached material into a duct (84) where an elevator (85) moves it over a screen (86) for separation of the seeds.

32 Claims, 13 Drawing Sheets

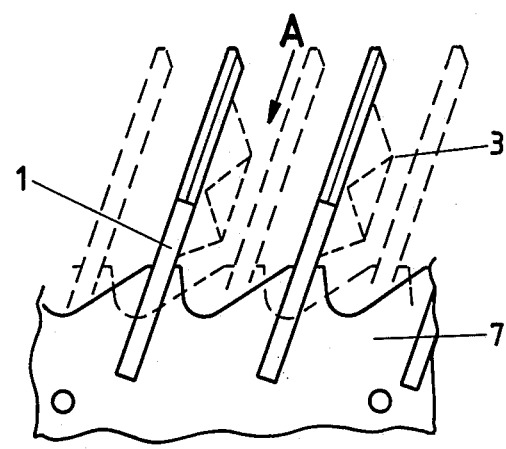
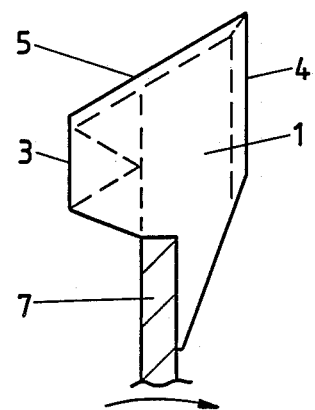
FIG.2  FIG.2a
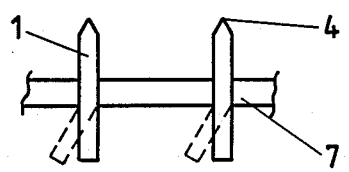
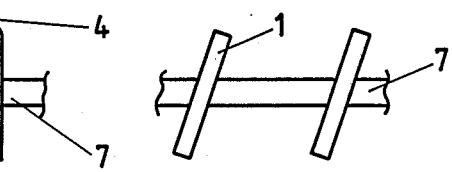
FIG.2b  FIG.2c
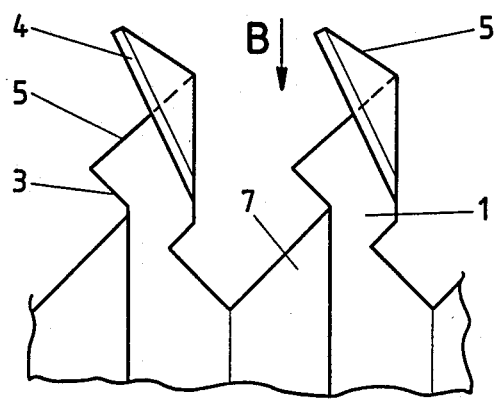
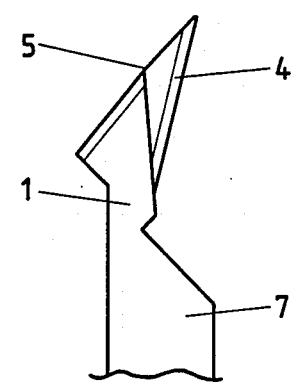
FIG.3  FIG.3a
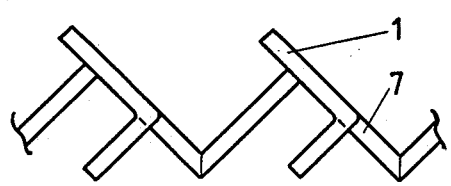
FIG.3b

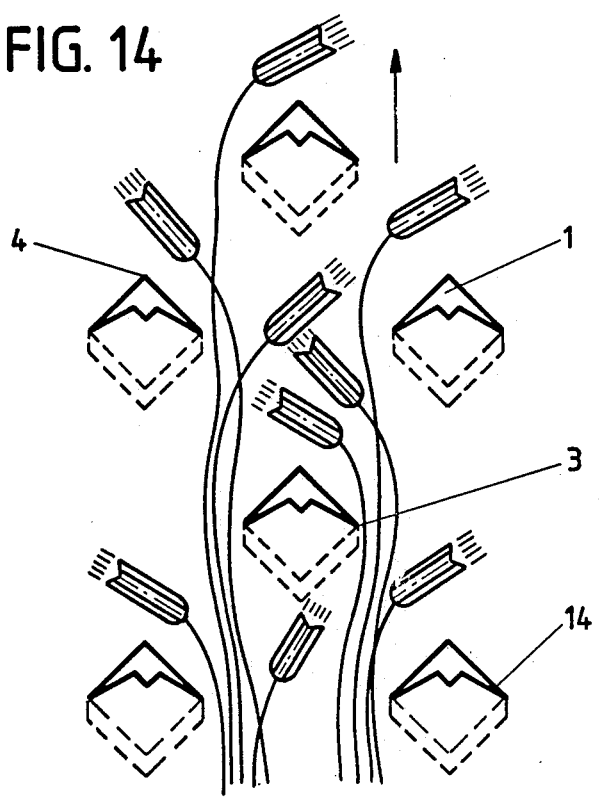
FIG. 14
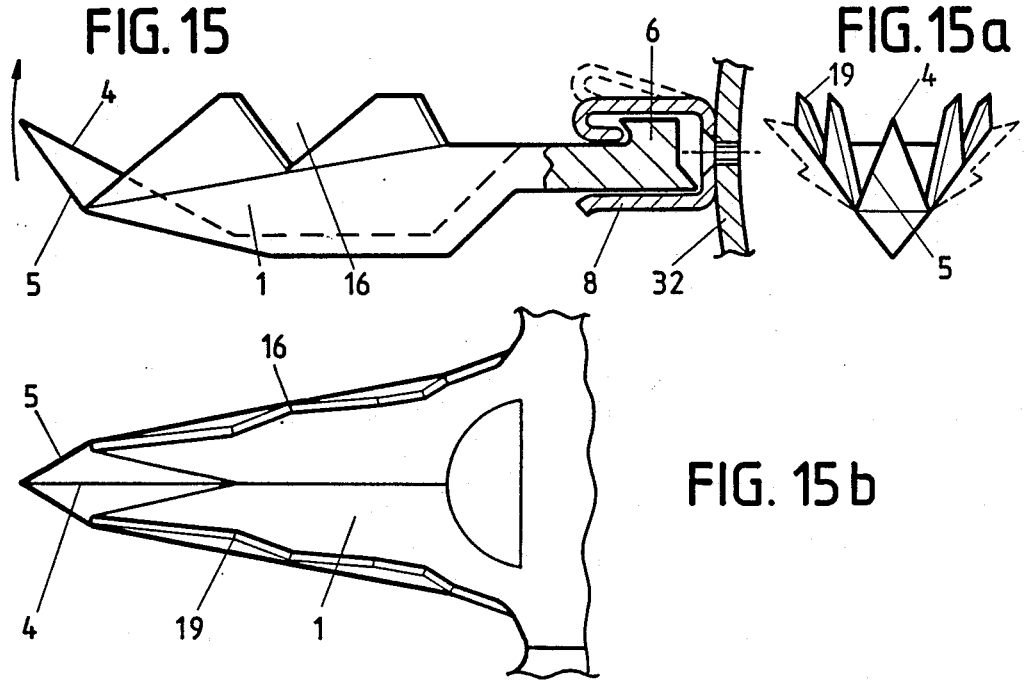
FIG. 15
FIG. 15a
FIG. 15b

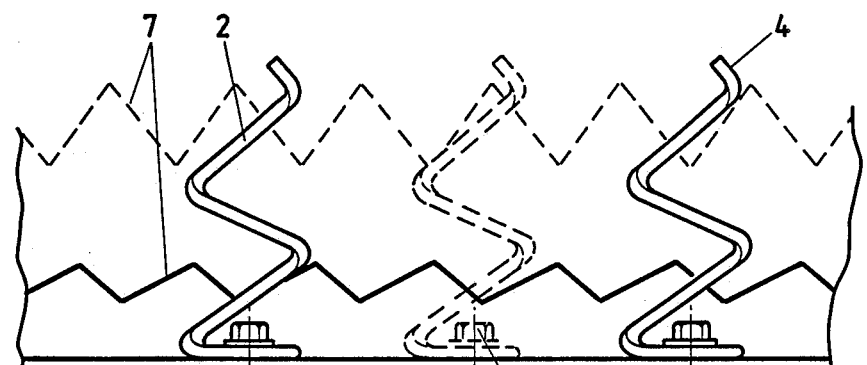
FIG. 17
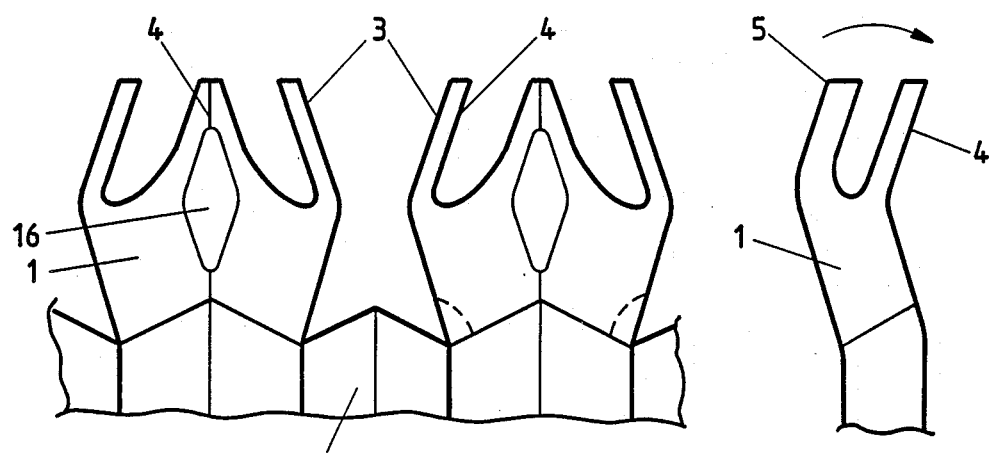
FIG. 18
FIG. 18a
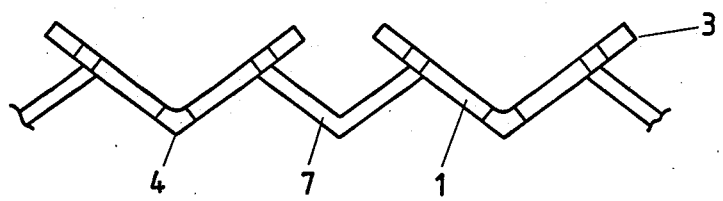
FIG. 18b

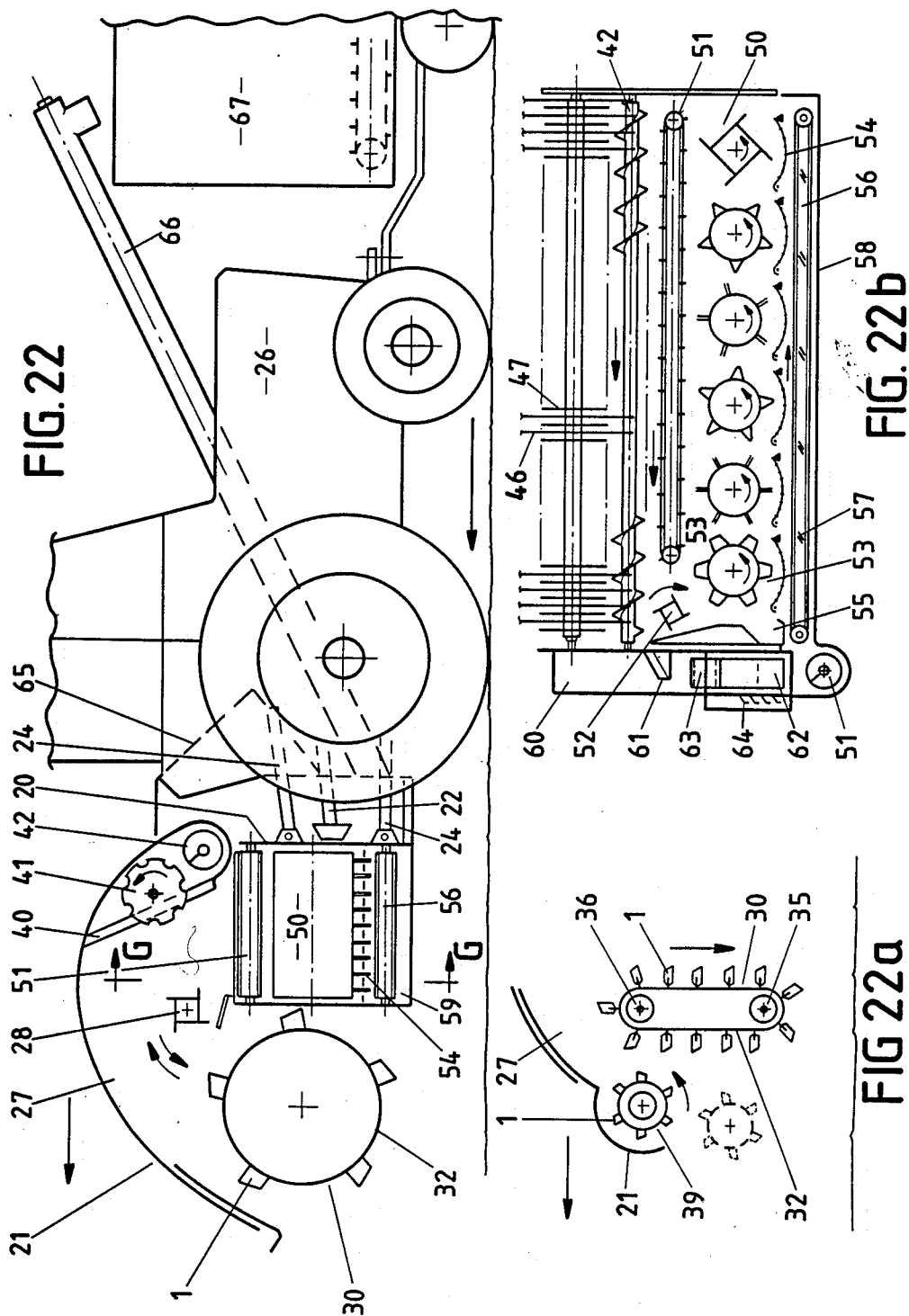

APPARATUS AND METHOD FOR HARVESTING CROPS BY STRIPPING

The present invention relates to apparatus for, and a method of, harvesting crops. It is concerned with detaching from plants, without cutting them, seeds, seed-bearing parts, seed bodies, and certain fruits and/or foliage, collecting the detached material and separating from it the wanted plant parts. The invention has particular application in the harvesting of grain crops, such as wheat, barley, oats and rice, but also has application in the harvesting of pulses, oilseeds and herbage seeds.

The invention has application also in the harvesting of nuts and other seed bodies and of flower heads, some fruiting bodies and foliage.

Commonly the harvesting of seed crops, particularly cereal and herbage seed crops, is carried out by a once-over, destructive operation which involves the cutting of the seed-bearing stems near their base. Harvesting machines, particularly combine-harvesters, are easily overloaded by large volumes of crop bulk, because these create problems of seed detachment and separation.

The in-situ stripping of seeds from the uncut crop has been attempted repeatedly and has met with varying degrees of success. In-situ seed stripping by a rotary device became known through U.S. Pat. No. 1,290,484 entitled 'Standing Grain Harvester'. However, none of the early disclosures made adequate provision for satisfactorily harvesting seeds or other wanted parts from crops which are unfavourably presented, because they are either severely leaning, tangled, twisted or laid, with the wanted parts in close proximity of the ground.

The most recent disclosures of in-situ seed stripping are by the present inventor in published pending patent application Ser. Nos. PCT/GB86/01972 and GB 2188822A, and in unpublished pending patent application Ser. No. PCT/GB88/00001. These relate to crop stripping apparatus using crop engaging elements which are preferably resiliently mounted or made of resilient material, so that damage is avoided of inadvertent contact is made with the ground or with foreign objects on the ground.

It is among the objects of the present invention to provide an improved apparatus for, and method of, removing wanted plant parts from an uncut crop, and to overcome many of the known disadvantages of existing harvesting machinery and methods.

More particularly, it is an object of the present invention to reduce losses of wanted plant parts, particularly seeds, which can occur in some crops and conditions with existing crop engaging elements, to keep the fan effect and the energy requirement of crop stripping rotors low, to minimise the detachment of unwanted material and to maximise the detachment of individual seeds, as opposed to whole or part seed heads, or of other wanted parts, so that any subsequent task of separating and cleaning the wanted fraction is facilitated and the required mechanisms may be kept small and simple.

According to one aspect of the present invention there is provided apparatus for harvesting crops comprising: a mobile support structure for movement over the ground; moveable support means capable of being driven relative to the support structure and extending transversely across the direction of forward movement of the apparatus; a plurality of crop engaging elements cantilevered outwards from the moveable support means; means for driving the moveable support means so that the crop engaging elements comb through the uncut crop at a front region, to detach and recover wanted parts including seeds; crop guide means extending over or under the apparatus to prevent detached crop particles becoming lost and to direct them rearwards for collection; characterised in that at least some of the crop engaging elements comprise crop stripping elements, each having a prominent leading edge and each forming operation a wedge effective in the direction of movement of the elements for splitting the crop mass apart and for detaching wanted parts from the plants. It is believed that separation from the crop mass of the wanted parts, such as seeds, is achieved in embodiments of the invention primarily by beating, prising, rubbing and shaking such wanted parts off the crop. Other mechanisms involved include bending, breaking, cleaving and tearing.

According to another aspect of the invention, there is provided a method of harvesting a crop comprising: moving through the uncut crop an apparatus according to claim 1, whilst driving said moveable support means so that the crop engaging elements comb through the uncut crop at a front region of the apparatus, whereby said crop stripping elements having said prominent leading edges form wedges effective in the direction of movement of the crop stripping elements and which split the crop mass apart and detach wanted parts from the plants, the method including impelling the detached crop parts towards a collection facility.

The apparatus of the invention operates by detaching from the seed-, flower- or fruit-bearing stems of uncut plants the wanted parts by combing through the crop, leaving the stems standing.

The apparatus preferably also comprises associated compact apparatus for separating already threshed seeds from the wanted and unwanted material detached by combing, and for completing the detachment and separation of seeds from whole or part seed-bearing heads broken off and collected during the combing process.

The present invention finds application in self-propelled machines for harvesting seed and forage crops, and in machines which are mounted on single- or multi-axle tractors to be pushed or pulled through the crop.

The form of the crop engaging elements has beneficial effects upon the effective operation of preferred embodiments of the invention. The size and shape of the elements, together with their operating angles and lateral and circumferential spacings, may be selected to maximise the desired effects in terms of seed detachment and recovery during the combing process.

As a plant stems are stroked by fast moving crop engaging elements, the stems are deflected more readily laterally than the relatively heavy seed-bearing heads. Because of their inertia, the seed heads adjacent to elements are subjected to a whiplash effect. This causes seeds to be shed, particualrly when seed heads collide with the edges and surfaces of the elements or with each other. Sometimes all or part of a head still containing seeds can break off.

Individual seeds which become detached on, or collide with, crop engaging elements bounce off and, in operation of known harvesters, may be launched into trajectories, particularly forwardly directed trajectories, which are unfavourable for recovery.

In accordance with one preferred feature, in embodiments of the invention, the outwardly projecting crop combing elements are moulded from resilient material and are smoothly shaped to minimise any crop tearing effect. Conveniently the elements may be flat in their attachment region for predictable yielding in that region if an impact with the ground or with a heavy object should occur. The flat attachment region may be laterally angled relative to the tranverse rotor axis so that yeilding of the outer region of an element into a reclined position may take place in an inward and lateral direction.

In accordance with another preferred feature the crop stripping elements may comprise rods or fins, each forming or being provided with a prominent leading edge region for entering into the crop with minimal disturbance. The prominent leading edge of the crop stripping elements may extend outwardly in one direction or in more than one direction.

Conveniently there may extend from the prominent leading edge of a crop stripping element on one or both sides a laterally declined surface so that in operation of the elements the crop mass is split apart by the action of a single- or double-bevel wedge respectively and wanted plant parts are beaten, prised or shaken off and are directed laterally. The trailing side surfaces may be flat, curved, grooved, ribbed or otherwise contoured.

Preferably the trailing side edge of each declined crop engaging surface may be generally parallel with the prominent leading edge. Preferably also the outer edge may be reclined in the direction of movement.

Conveniently there may be provided, preferably in the edge regions of the crop stripping elements, recesses and/or protrusions to enhance the stripping effect and impel detached particles into laterally and/or inwardly directed safe recovery trajectories.

Conveniently circumferentially adjacent crop stripping elements may be so spaced laterally that their declined surfaces overlap in the direction of movement of the elements, or there may be provided lateral clearance.

In accordance with yet another preferred feature outwardly extending crop engaging elements may comprise crop stripping elements mounted on the moveable support means in helically arranged succession in such a way that each of the prominent leading edges is preferably forwardly inclined, and the laterally extending surfaces taper rearwardly and inwardly towards the moveable support means. In operation of the helically arranged crop stripping elements, upstanding crop comes to be laid at an angle across the prominent leading edge regions, and complete detachment of wanted plant parts is accomplished by the combined effects of leading and trailing edge regions.

Conveniently the spirally arranged crop stripping elements may be formed of sheet-like material in continuous or sectioned strips. They may be moulded or mounted so that the outer edge regions of the elements are laterally offset relative to the mounting region. The outwardly extending leading edge and the trailing region of the preceding element may be profiled to enhance the stripping effect by the provision of recesses and/or protrusions.

In accordance with a further preferred feature the crop stripping elements may comprise a strong spine in the outwardly extending prominent edge region, and the trailing region of each laterally declined crop engaging surface may be formed of thinner and more flexible material, to allow preferential yielding of the side regions in response to increasing crop pressure and friction.

The flexible side regions may be divided by lateral slits, preferably normal to the prominent leading edge region, so that each section forms a flap which may yield independently, allowing intrusion of stiff plant stems into the normal profile of the elements, so that the stems are momentarily enveloped from the sides.

In accordance with a yet further feature the crop stripping elements may resemble an outwardly directed conical coil spring with widely spaced coils to allow intrusion of the crop from the sides and stripping of wanted parts as the crop is pulled through between the coils.

In embodiments of the invention the laterally declined crop engaging surfaces of wedge-form elements may lie in more than one plane, and there may be provided surface contouring, including transverse or longitudinal ribbing or corrugating, to improve the stripping characteristics of the crop engaging surfaces and edges and of any recesses and protrusions.

In preferred embodiments of the present invention the crop stripping elements may form separate or integral extensions of transversely or helically arranged and outwardly directed flat or corrugated ribs. The ribs may be provided with serrations at their outer edge, so that broken-off crop fragments still containing seeds are subjected to a more severe threshing effect on impact with the edge than would be provided in the absence of an edge or by a straight, smooth edge.

Conveniently crop stripping elements may be attached also to the moveable support means so that the elements are interspersed with the transversely or helically arranged ribs. Detached crop parts which fall or slide into the space swept by the ribs may be impelled outwards for recovery. The ridges and depressions formed in corrugated ribs are advantageous, particularly in the harvesting of small and light seeds, in that detached seeds may be collected together into distinct streams.

Conveniently the side edges of acutely serrated and preferably corrugated ribs may co-operate with the stripping elements to direct crop stems laterally into the zone of influence of the elements. Circumferentially successive, acutely serrated ribs may be staggered laterally relative to stripping elements, to intercept and redirect all detached crop parts.

Conveniently the attachment region of crop stripping elements may lie in a plane which differs from the plane or planes of the crop engaging region. Crop stripping elements which form extensions of transversely or helically arranged ribs may be connected with the ribs in continuation of the principal plane of the rib in the attachment region, or in a plane different from the plane of the rib in the connecting region.

In other preferred forms the elements may be formed, preferably by moulding, with the base portions thickened, in stepped form or by gradual lateral tapering towards the support means. Corresponding guides, which may be welded, screwed, bolted or otherwise secured directly to the moveable support means, may be provided to enable the elements to be slid into their operating positions and to be retained there securely. Conveniently in an alternative form the guides may be so shaped that outwardly directed flanges may be sprung apart by forcing the shaped base portion of the elements between them. On return to their normal dispositions at least one of the flanges locks the elements in position.

Alternatively the elements may be bolted or pinned to continuous or sectioned flange-type, channel-section or other types of bracket.

As an alternative to securing the guides or brackets directly to the moveable support means, which may be tubular of circular or polygonal cross-section or may consist of a continuous belt, the retaining means for the elements may be attached to transverse or circumferential strips of metal or other rigid or semi-rigid material, and the strips in turn may be bolted, slideably located or held in tension on the surface of the moveable support means. A particular advantage of mounting brackets and guides for the wedge-form crop stripping elements being attached to strips which can be tensioned around the circumference of moveable support means of tubular construction is that the lateral spacing of circumferential arrays of elements may be easily varied by slackening the tensioning means, relocating the mounting straps and re-tensioning them. Reversing the elements for operation of the crop stripping device in the opposite direction is also made possible.

In embodiments of the invention the height-adjustable moveable support means to which the crop engaging elements are secured may be driven to move the elements through the crop in the overshot or the undershot mode, that is to say in such a way that the elements move respectively upwards or downwards at a front region. Conveniently the crop flow passage may extend around the upper part of the crop stripping device, when the device is driven in the overshot mode. In the outward direction the passage is defined by a preferably smoothly curved crop guide cover which serves to direct detached plant parts rearwards to the second part of the apparatus for further processing, cleaning and collection.

In some embodiments of the invention the crop stripping device may be driven so that the crop engaging elements move downwards at a front region. This form of operation is particularly appropriate in short crops and when the crop stripping elements are formed to impel detached plant parts initially inwards relative to the tips of the elements. Conveniently the crop flow passage then extends around a lower part of the crop stripping device, and it may be defined in the outward direction by one or more conveying rotors, or preferably by a belt conveyor, which may be cleated or provided with transverse slats.

Preferably the lower conveying means are provided with means for adjustment of the angle of inclination relative to the ground, independent of the height adjustment of the stripping rotor and of the apparatus as a whole. Preferably also the stripping rotor is provided with means for adjustment of its fore-and-aft position, so that from a wide range of possible settings the most appropriate combination may be selected for effective and efficient crop recovery regardless of the conditions of the crop and of the ground.

The height-adjustable moveable support means may comprise a horizontal rotor mounted in the mobile support structure substantially transverse to the path of forward movement of the apparatus, or leading at one end, the rotor being provided with at least two transversely arranged arrays or one helically arranged array of crop stripping elements.

Alternatively the height-adjustable, driven moveable support means may comprise a continuous belt or flexible sheet which extends across the full working width of the apparatus, generally transversely to its path of forward movement and vertical, or forwardly inclined in the front region. The full-width belt or other means may be supported, under sufficient tension to transmit the required driving force, between two rollers or sets of sprockets or wheels. Preferably there may be secured to the driven side of the flexible support means teeth or toothed belts at least near both sides, to register with toothed wheels or pulleys at least on one of the shafts which provides the drive.

Advantageously there may be provided an additional high-speed front rotor co-operating with the principal stripping device when this is driven in the overshot mode. Thus there may be provided a preferably separately height-adjustable rotor facing the principal stripping device and rotating in the lower centre region against the direction of forward movement of the harvesting apparatus. Around a variable part of its front region the additional rotor may be shielded by a hood against premature contact with the crop. The additional rotor is driven at peripheral speeds suitable for stripping wanted plant parts from the forward facing regions particularly of seed heads, to redirect into recovery trajectories seeds which are propelled against it by the principal stripping device, and to assist feeding of the crop into the principal stripping device, especially when the crop is tangled or lodged.

The additional rotor may be provided for stripping forward facing plant regions with transversely or helically arranged serrated ribs or with arrays of crop stripping elements of the present invention.

In an alternative embodiment the additional rotor may be densely studded on its core surface with tough but relatively soft protrusions which may taper towards their tips and may be circular or oblong in cross-section. The protrusions serve to remove seeds from the forward facing plant parts and to lift crop by a flailing action. Any particles which may be thrown against the rotor are particularly likely to be re-directed upwards. In known manner an adjustment may be provided for the position of the hood which covers the additional rotor at the front, to advance or retard contact between the crop and the rotor.

In embodiments of the invention there may be combined, with the crop stripping device, preferably transversely oriented apparatus for separating wanted from unwanted crop fractions and for cleaning the wanted fraction. Accordingly there may be provided transversely arranged compact means for separating the free seeds already threshed by the stripping device, re-threshing any crop portions still containing seeds, separating the further detached seed and optionally applying primary cleaning to the separated seed before conveying it for final cleaning and collection.

In preferred embodiments, an upper crop guide cover defines with the seed stripping and separating apparatus a rearwardly extended crop flow passage through which stripped material reaches the separating section. Near the end of the crop flow passage there may be provided a transverse array of thin spaced-apart driven discs on a common shaft, optionally intermeshing with thin, static, spaced-apart, forward-facing fins bridging in the vertical plane the space between the crop guide cover at the top and a transverse conveyor, preferably an auger conveyor, for separated seeds and other small crop particles to fall into.

Yet a further or alternative means of separating small from coarse detached material may be provided by a transversely and generally horizontally arranged open-mesh conveyor made of pivoted metal links or flexible mesh material. Preferably the screen apertures are so dimensioned that seeds may pass through the upper and lower runs of the conveyor, which move in opposite directions, to be transported sideways by transverse scraper slats attached to the conveyor and co-operating with a floor plate. Thus, coarse material is conveyed in one direction on the upper level and wanted plant parts, particular seeds, with small impurities in the opposite direction at the lower level.

Improvement of the separating effectiveness of the open-mesh conveyor may be provided by agitating means fitted beneath the upper conveyor run so that this is lifted and lowered abruptly at short intervals. The agitating means may consist of two or more shafts arranged transversely to the direction of conveyor movement, each shaft carrying at least one set of lobes or eccentric rollers, the shafts being kept in synchronisation, as required, by a chain joining equal-sized sprockets at the ends of the shafts.

Beneath the open-mesh conveyor there may be positioned threshing means for detaching and separating from the coarse material any unthreshed seeds. Conveniently the threshing means may comprise one threshing and one beating drum or a succession of such drums arranged and driven generally with their axes in the horizontal plane and oriented in the direction of forward movement of the apparatus.

The threshing and beating drums may co-rotate to move the crop beneath them from the feed end to the discharge end. As an alternative to feeding from above, the stripped material may be directed to the feed end from a lower level for threshing, for example from a transversely acting, side- or centre-delivering table auger of known configuration.

Beneath each drum there may be provided an open-grate concave generally of known construction for separating out the detached seeds. In accordance with common practice the clearance between each concave and drum is adjustable to vary the severity of treatment.

To protect the multi-drum tangential threshing means against damage by foreign objects entrained in the crop, a stone trap is preferably provided in front of and beneath the entrance to the primary threshing unit. In addition, each concave may be pivoted at the upstream end and supported resiliently, preferably on elastic springs, at the exit end. Depending on the crops to be threshed, the threshing drums may be provided with conventional rasp bars or with studs or pegs which give a more severe action.

As an alternative to individual concaves being provided under each threshing or beater drum, all the concaves may be mounted on a common support structure with adjustment being provided to lift or lower the front and/or rear on either or both sides.

Because harvesting seed by in-situ stripping can reduce the straw intake by around 50%-90%, the re-threshing means may be dimensioned more modestly than in a conventional combine-harvester. Where high throughput is essential, the fore-and-aft length of the threshing and beating drums may be increased. Alternatively, the multiple-drum rethreshing means may be replaced by an axial threshing rotor with cylindrical concave surrounding it.

In known forms of such axial threshing means the crop is fed usually to a helical intake impeller axially or from a tangential direction, always at a low level, and not from the rear or above, as in the present invention.

In the axial threshing unit the crop is treated in a spiral path guided by helically arranged deflectors on the inner surface of the cylindrical open-grate concave and/or by suitably angled threshing bars on the rotor. The threshing region is adjacent the feed region and is followed by the separating and discharge regions.

Beneath the threshing means, whether tangential or axial, there may be provided an open-mesh transverse conveyor for separating out seeds from any coarse material which may have passed through the threshing concaves, the coarse material being conveyed at the upper level in one direction, conveniently for discharge on to the field surface, and the seeds being conveyed in the opposite direction at the lower level for transfer into another, preferably rearwardly directed conveyor.

The open-mesh conveyor may be agitated by eccentric means under the upper run to encourage seeds to pass through. Additionally there may be provided transverse slats, to make conveying over a solid base plate positive and increase the capacity of the conveyor.

Seeds separated from coarse material at a higher level may be conveyed, preferably by an auger conveyor, to a convenient side region, where it may be allowed to cascade downwards in an evenly distributed stream through an air stream of controllable velocity and direction for the removal of light impurities. All the separated and cleaned seeds may then be conveyed, where necessary via a final cleaning apparatus, to a bulk tank preferably provided with transloading facility.

The alternative forms of separating apparatus are provided downstream of the crop stripping apparatus for separating already threshed and unthreshed seeds and for cleaning the seeds by space-saving compact means arranged and driven to operate transversely across the path of movement of the harvesting apparatus so that material flows from side to side and from an upper to a lower level across all or part of the width of the apparatus.

Although the cleaning part of the preferred form of apparatus has been described in a specific manner, it should be noted that before or after primary separation of seeds threshed by the stripping apparatus the collected material may be allowed to fall to a lower level where a transversely arranged auger or other crop conveyor behind the stripping apparatus transfers it to one side or into the centre for rearward feeding by known means into the intake region of a transversely arranged tangential or axial threshing apparatus, as previously described. Optionally the threshing apparatus may be inclined towards the discharge region so that space is available under much of the threshing apparatus for known seed cleaning and conveying apparatus to be provided.

An alternative form of primary cleaning apparatus for stripped seed samples contaminated with coarse unwanted crop fractions may be provided by replacing with a perforated screen or sieve the floor plate of the kind of crop elevator which is commonly used in conventional combine harvesters for feeding the cut material from the cutting table to the threshing mechanism. Cut seed-bearing crops do not contain worthwhile quantities of free seeds, but during in situ stripping, particularly of grain crops, over 90% of the seeds may be threshed by the stripping device of the present invention.

The screen which may be provided under the crop elevator may have fixed apertures of different shape and size, or it may be an adjustable-aperture sieve. The screen may be kept static, or it may be reciprocated in or across the direction of crop flow or about a pivot positioned in any of a range of locations in or adjacent the screen area. Separated seeds fall on to a collecting ramp, from which they slide into, for example, an auger conveyor or are removed by scraper or other means.

A seed separating conveyor may employ slats, tines, fingers or other discontinuous means for moving stripped crop material over a perforated surface, optionally delivering it to further processing means, which may be oriented parallel with or tranversely to the direction of movement over the ground of the harvesting apparatus.

The present invention may be put into effect in such a way that the apparatus may be mounted on a tractor, preferably a tractor with reverse drive facility, that it may be mounted on a self-propelled vehicle with appropriate controls and optionally provided with final seed cleaning means and a holding tank with emptying conveyors, or that it may replace the cutting tables of conventional combine harvesters.

Generally the invention finds application in the harvesting of mature seeds by a single pass or in successive passes, including cereals, pulses, oil seeds and herbage seeds, and in the harvesting of whole seeds bodies, some fruiting bodies and foilage fractions.

Preferred embodiments of the present invention to be described provide, in addition to compactness of construction offering low weight and cost, the advantages of high work rates and hence low harvesting costs, timeliness of harvesting, extended time availble to the farmer for preparing for the next crop, and efficient and ecnomical disposal or utilisation of the crop residue, which dries quickly after rain and is favourably presented for burning, chopping or harvesting, as required.

Embodiments of the invention will now be described by way of example with reference to the accompanying drawings, in which:

FIG. 1 is a diagrammatic cross-sectional side elevation of a stripper harvester embodying the invention;

FIGS. 2 and 2a respectively front and side elevations of fin-like crop stripping elements with pronounced leading edges;

FIG. 2b is a view in the direction of arrow A in FIG. 2, and FIG. 2c shows in end elevation the fin-like crop stripping elements tilted laterally;

FIGS. 3 and 3a are respectively front and side elevations of crop stripping elements forming outwardly directed extensions of transversely arranged, serrated and corrugated ribs;

FIG. 3b is a view of the elements in FIG. 3 in the direction of arrow B;

FIG. 14 shows schematically the interaction between crop stems, seed heads and wedge-form crop stripping elements, as they appear in plan view in a section of the development of the surface of a corp stripping device;

FIGS. 15 and 15a are respectively side and end elevations of a crop stripping element of the invention capable of momentarily gathering detached plant parts, illustrating also a self-locking mounting arrangement;

FIG. 15b is a plan view of the crop engaging part of the element shown in FIG. 15;

FIG. 17 shows coil-shaped crop stripping elements and interspersed serrated ribs of alternative depth;

FIGS. 18, 18a and 18b show respectively front, side and end elevations of crop stripping elements connected to serrated corrugated ribs, the elements being provided with apertures and recesses to achieve maximum threshing effect;

FIG. 22 shows in diagrammatic cross-sectional side elevation a harvesting apparatus embodying the invention generally in the form of a tractor-mounted device;

FIG. 22a shows in cross-sectional side elevation an alternative crop stripping device; and FIG. 22b is a cross-sectional front elevation showing details of the seed separating and cleaning apparatus, as seen in the direction of arrows GG in FIG. 22.

Figure 1:
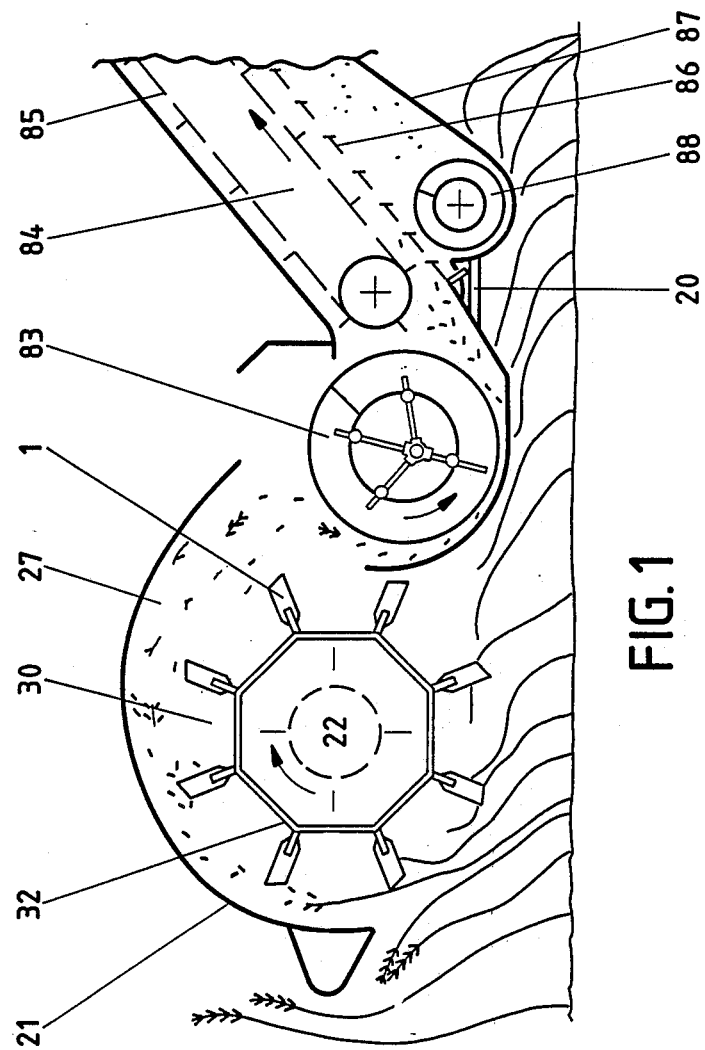

Throughout this specification corresponding components of the various arrangement have been given identical reference numerals. For brevity and simplicity the functions and inter-relationships between the various components components are described and explained only when they are first mentioned and not fully in connection with each figure. Thus it is to be appreciated that each time corresponding components with identical reference numerals are referred to, the appropriate description applies.

Referring first to FIG. 1, there is shown in diagrammatic side elevation a generalised layout of one embodiment of the present invention for harvesting crops by stripping off the wanted parts in situ. The apparatus comprises a mobile support structure, or frame, indicated generally at 20, for movement over the ground when pushed or pulled by a tractor, or when attached to a self-propelled power unit.

Connected to frame 20 is a moveable support means 32; in the embodiment shown this is a hollow tube, but other support means may be used, for example a continuous belt. Mounted on the support means 32 are a plurality of outwardly projecting crop engaging elements 1, which may take several different forms, as described hereinbefore or hereafter. In combination the moveable support means 32 and the corp engaging elements 1 form a rotary crop stripping device 30. This is driven by drive means indicated diagrammatically at 22, which may comprise a drive train made up of gears, belts, chains and/or hydraulic means, using power derived conveniently from the engine of the operating unit.

The direction of rotation of crop stripping device 30 is such that the crop engaging elements 1 comb through the crop in the upward direction at a front region, splitting the crop mass apart by a wedge action. Detachment of wanted plant parts is accomplished at peripheral speeds in the approximate range of 8 to 40 m/s at the tips of elements 1 by beating, bending, breaking, cleaving, rubbing and tearing the crop. It is achieved also at least in part by shaking due to the whiplash effect resulting from appropriate lateral inclinations and the lateral and circumferential spacings of the elements as they comb through the crop.

To prevent material detached from the crop by stripping device 30 becoming lost, there is provided a crop guide cover 21; this cover is preferably smoothly curved and extends from in front of the seed stripping region to beyond the rear of stripping device 30. The unobstructed space beneath the cover 21 forms a crop flow passage 27.

In the embodiment shown in FIG. 1 the stripped material is directed into a transverse conveying auger 83 which is located in a trough and has series of retracting fingers over part of its length. The fingers serve to push the collected material into ducting 84 where a slatted chain elevator 85 conveys it to a higher level for further processing or collection.

When seed crops are harvested by stripping with the harvester shown in FIG. 1, a high percentage of seeds is threshed by the stripping device 30. This free seed may be separated from any coarse crop fraction through a screen 86, which is shown diagrammatically to provide the floor of duct 84. A ramp 87 directs the separated seeds into a transverse conveyor 88, conveniently an auger conveyor, for transfer to one side of the apparatus.

Screen 86 may be provided over the whole or part of its surface area with apertures which allow mainly seeds and not coarse material to pass through. The apertures may be of fixed size and shape; alternatively the screen 86 may be a sieve with adjustable apertures, for example a frog-mouth or laminar-type sieve.

Preferably the screen 86 may be trapezoidal, being widest at the upper delivery end. An eccentric drive mechanism of known form may be provided to cause the delivery end of the screen to reciporcate in an arcuate path about a pivot near the centre of the lower feed-on end.

Material fed on to the inclined screen 86 by slatted chain conveyor 85 has threshed seeds concentrated in the lower stratum of the crop layer, so that may seeds pass through the apertures close to the feed-on region. The lateral movement of the screen increases towards the delivery end, and this increase crop agitation, so that any remaining free seeds are dislodged from the mat of coarse material and become separated.

Conveniently the pivot for screen 86 may be positioned in a range of locations in or adjacent the screen area. As an alternative to the pivotal motion, the screen may be reciprocated in or across the direction of crop flow, or it may be kept static.

An advantage of a screen which is static or reciprocated in the direction of crop flow is that the screen may be transversely dished to be concave on its upper crop facing surface, so that the crop moving means on the conveyor above, such as slats, ribs, tines, fingers or other discontinuous means, may be of unequal length and arranged to form a transverse tip profile which is shaped to be convex. In this way the difference between the density of seed and other crop matter causes the seeds to migrate by gravity into the central region of the screen, where the population density and shape of the crop moving means may be so arranged that a high degree of agitation, and consequently separation, is achieved.

Referring next to the crop engaging elements, which perform the important function of detaching the wanted crop parts, there is shown in FIGS. 2 and 2a respectively a front and a side elevation of fin-like crop stripping elements 1 forming, or having provided on them, a prominent leading edge 4. The elements are moulded to be connected with a transverse rib 7 so that the prominent leading edges lie at an angle to the direction of forward movement, to form inwards of the element tips laterally offset regions in which forward facing parts of the crop may be stripped by the co-operation on laterally and circumferentially adjacent elements of edges 3, 4 and 5, which bound the outer region of crop stripping elements 1.

Parallel sided crop entry regions are provided by the prominent leading edges 4 of laterally adjacent elements. The crop entry regions form the leading regions of rearwardly extending crop stripping passages, which may also be laterally, oriented, in which the edge and surface regions of adjacent elements co-operate to act upon the corp.

The transverse rib 7 is serrated or scalloped at its outer edge in such a way that crop stems are deflected behind the laterally angled outer regions of the fin-like elements for complete stripping of the forward facing parts of the crop. The principal planes of crop stripping elements 1 and transverse ribs 7 are disposed normal to each other.

Like prominent leading edge region 4, the outer edge region 5 may be bevelled to be sharp along its crop facing length. Preferably edge 5 is reclined in a straight or curved line in the direction of movement of elements 1, to prevent its trailing end in particular from dislodging and impeling forwards wanted crop parts.

Conveniently ribs 7 may be provided at appropriate lateral spacings with mounting holes for attachment to outwardly extending mounting means such as flanges arranged on the surface of the moveable support means.

FIG. 2b is a view in the direction of arrow A in FIG. 2, showing in full outline the normal relationship of the fin-like elements 1 to the transverse ribs 7. In broken outline in FIGS. 2 and 2b there is indicated that the trailing regions of elements 1 may be angled laterally and, optionally, may be profiled to form serrations. Circumferentially adjacent arrays of crop stripping elements 1 may be laterally offset, as shown in broken outline in FIG. 2.

FIG. 2c indicates that fin-like elements 1 may be inclined laterally throughout their depth relative to transverse ribs 7. This lateral attitude of the elements increases crop contact and achieves more positive impelling of detached crop parts both laterally and inwardly towards the moveable support means.

In the outward direction fin-like elements 1 as shown in FIG. 2 may be set normal to the transverse axis of the moveable support means, provided they are inclined so that at least half the elements have trailing edges which are laterally offset relative to the leading edges and/or the crop stripping device is angled laterally relative to the direction of forward movement.

Conveniently for some applicatins rod-like crop stripping elements may be substituted for the fin-like elements shown in FIG. 2.

FIGS. 3 and 3a are respectively front and side elevations of crop stripping elements 1 which form outwardly directed extensions of transversely arranged serrated and corrugated ribs 7. The outermost tip region of element 1 is bounded by prominent leading edge 4 and part of reclined edge 5; it lies in a different plane to the inner region of the element.

Elements 1 and corrugated ribs 7 are disposed in several different planes, and conjointly they form regions inwards of the tips of the elements, which regions are laterally and/or inwardly offset relative to the tip paths of elements 1, so that forward facing wanted parts of the crop may be stripped off when the crop stems enter into the regions. The offset regions may be provided to be sufficiently spacious to accommodate most crops regardless of stem thickness, and they may take different shapes and have different spacings.

FIG. 3b is a view of elements 1 in FIG. 3 in the direction of arrow B, indicating that the outer regions of elements 1 may continue optionally in the same plane as the inner regions of the elements. Conveniently the shape and size of the outer region of elements 1, which may be inclined at different angles to the inner region, may vary in accordance with requirements.

Figures 4, 4A, 4B:
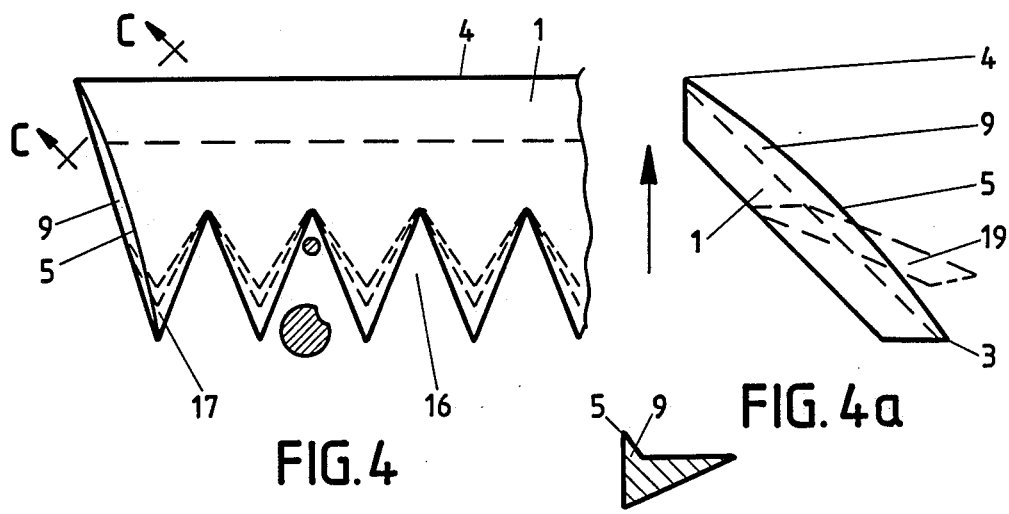
FIGS. 4 and 4a are respectively a side and end elevation of a wedge-form crop stripping element with coarsely serrated laterally declined trailing side region.
FIG. 4b is a cross-sectional view in the direction of arrows CC in FIG. 4.

FIGS. 4 and 4a are respectively a side and end elevation of another wedge-form crop stripping element 1 having a prominent leading edge 4 and a laterally declined surface with a serrated trailing edge 3. Along the reclined outer edge 5 of the surface is provided a protruding ridge 9 to block detached crop particles being impelled forwards. The serrations 17 in the side region of element 1 form tapering recesses 16 into which crop stems are able to enter, the extent depending on their cross-sectional diameter, for effective removal of wanted plant parts. The cross-sections of the small and large crop stems indicated diagrammatically in FIG. 4 may resemble a cereal and an oilseed rape stem respectively.

Conveniently, the depth and shape of the serrations in the side region of element 1 may be made more or less aggressive to suit the range of crops which are to be harvested.

Optionally, the serrations 17 may be moulded to project above the prinicipal plane of element 1 against the direction of rotation, to form curved or angled protrusions 19. These give advantageous stripping and impelling, particularly in crops which have free-flowing seeds.

FIG. 4b is a cross-sectional view in the direction of arrows CC in FIG. 4; it shows the general shaped of the raised ridge 9, which may be provided along the outer edge 5 of the laterally declined crop engaging surface of element 1.

Figures 5, 5A:
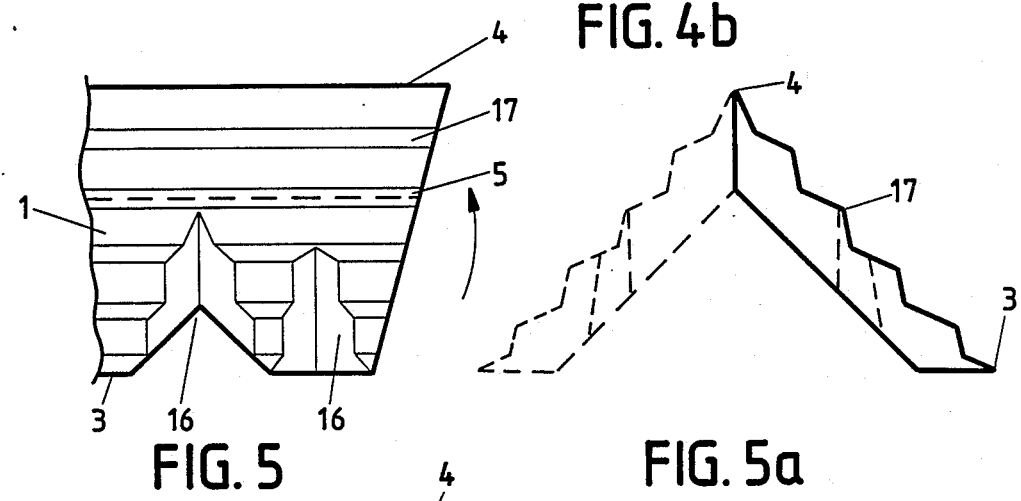
FIGS. 5 and 5a are respectively a side elevation of the outer part of a wedge-form crop stripping element and an end elevation, showing surface and edge profiling.

FIGS. 5 and 5a are respectively side and end elevations of the outer region of a wedge-form crop stripping element 1 which has an outwardly ridged laterally declined crop engaging surface. In operation the protruding ridges 17 create a washboard effect which reduces crop friction and enhances the stripping effect.

Optionally there may be provided in the region of trailing edge 3 notches 16 of depth less or greater than the thickness of the material from which the elements are made. Thus more or less pronounced recesses 16 may be formed with stepped side edges giving gentle but effective removal of wanted plant parts.

conveniently the notches 16 may be of symmetrical or asymmetrical shape and may be cut at different angles relative to the principal plane of the corp engaging surface. Protruding ridges 17 on the crop engaging surface may be provided in different directions and in more than one direction simultaneously. All or part of the crop engaging surface may be studded with small protrusions to make the surface rough, or there may be provided recesses, including perforations, of a variety of shapes and sizes.

Returning now to FIG. 5a, there is shown in broken outline the relative position of a complementary element, as seen in front elevation of a development of the rotor surface. Whilst for coarse crops, such as some row crops like beans and sunflowers, two inversely angled elements may be combined to form a double-bevel wedge, it is preferable for the majority of densely planted crops, particularly cereals, that the elements are effectively of single-bevel wedge shape.

Figures 6, 6A:
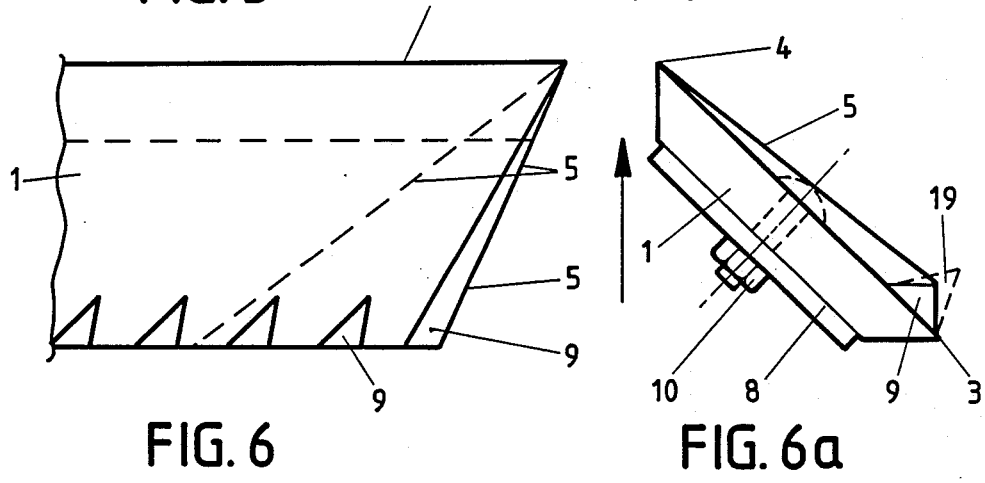
FIGS. 6 and 6a are respectively a side and end elevation of wedge-form crop stripping elements provided with protrusions on the laterally declined surface.

FIGS. 6 and 6a are side and end elevations respectively of an alternative wedge-form crop stripping element 1. Protrusions 9 in the region of trailing edge 3 are dimensioned to fall within the working width of the element in the direction of rotation; they are shaped and oriented to impel particles laterally and inwardly on detachment from the plants.

Preferably there is provided along the outer reclined edge 5 of element 1 an inwardly tapering ridge 9, to assist in the stripping of crop as it slides over the edge, and to deflect into favourable trajectories detached particles moving over the reclined surface in the front region.

For least losses in some crops and conditions the outer region of the element may be acutely tapered from the tip region towards the support means, as indicated by broken line 5 in FIG. 6. It is preferred generally that the crop engaging side regions of wedge-form crop stripping elements are shaped to resemble a parallelogram or trapezium, but for some purposes outer edge 5 may be tapered inwards from the tip region so that the side of the element forms a triangle.

FIG. 6a shows optional protrusions 19 extending from the crop engaging surface of element 1 into a region outside the effective width of the element. On its underside the element is supported by mounting bracket 8 to which it is secured by fastening bolt 10. At its inner end (not shown) the element 1 may be shaped to abut tightly against the curved or otherwise shaped surface of the moveable support means, to prevent rotation of the element in operation.

Figures 7, 7A:
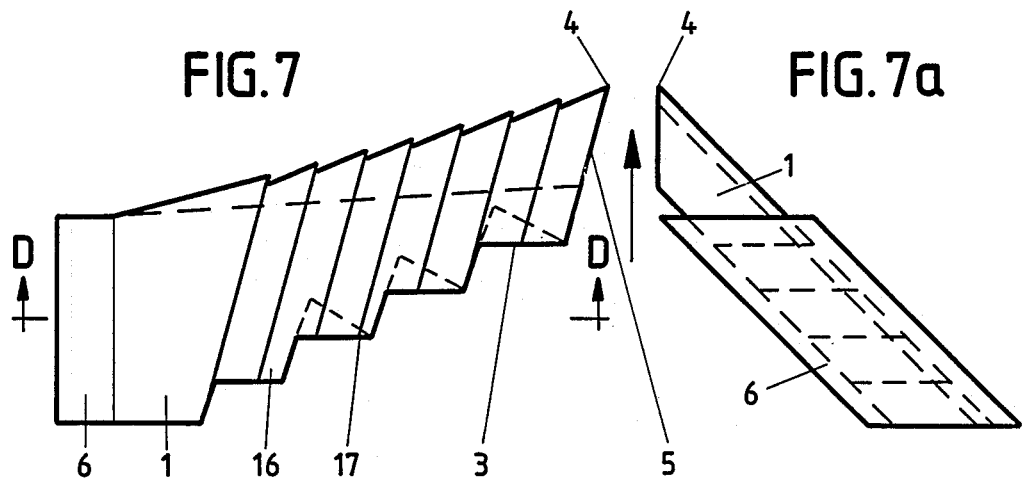
FIGS. 7, 7a and 7b are respectively a side, end and partly cross-sectional side elevation of a wedge-form crop stripping element provided with ribbed crop engaging surface and stepped leading and trailing edges.

FIGS. 7 and 7a are front and end elevations respectively of an element 1 having a ribbed crop engaging surface and stepped leading and trailing edges. The ribs run at a reclined angle across the crop engaging surface, forming small ridges 17 and depressions 16 broadly parallel to the outer edge 5.

The stepped prominent leading edge 4 is formed by the adjacent chamfered side face perpendicular to the transverse rotor axis intersecting the laterally declined ribbed surface. The edge pattern thus achieved assists in the parting of some crops, especially if they are tangled or weed-infested.

The ribbed surface is provided to enhance the stripping effect and to guide detached particles favourably. Purpose of the stepped trailing edge is to sub-divide the strip of crop being treated by each element and thus improve access to the seeds and other wanted parts within the crop mass.

In broken outlines in FIG. 7 is shown that stepped trailing edge 3 may be forwardly stepped in the inward direction, to be particularly effective in the stripping of forward facing plant regions.

Figure 7B:
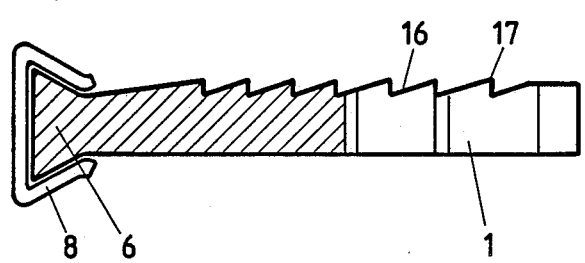

The base region 6 of element 1 is tapered inwards to form a wide foot section adjacent the moveable support means. This makes it possible to locate the base of the element and to hold it captive in an outwardly converging channel-section bracket, as indicated at 8 in FIG. 7b, which is a cross-sectional view in the direction of arrows DD in FIG. 7.

Figure 8:
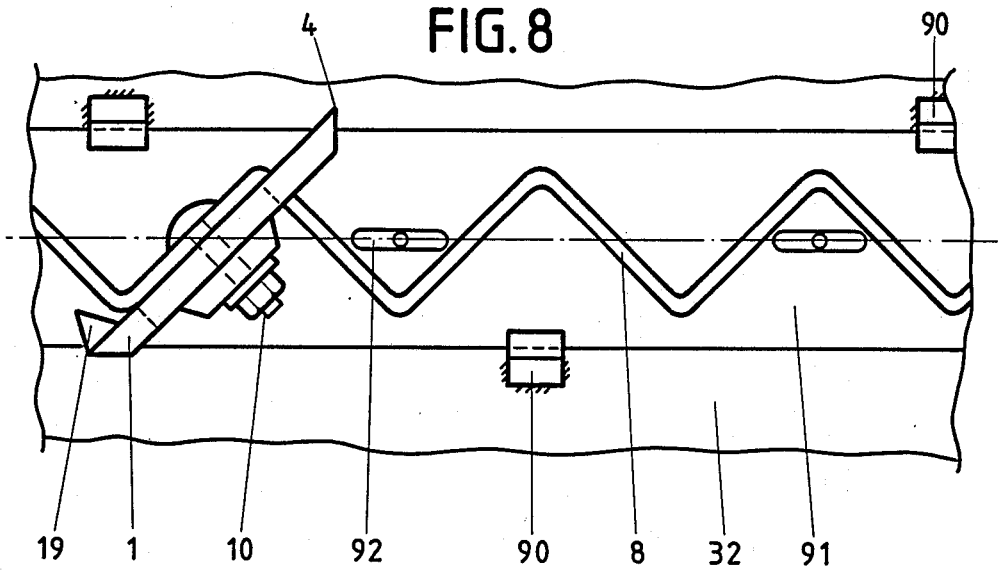
FIG. 8 is a diagrammatic end elevation of a wedge-form element attached to a cantilevered zig-zag bracket arrangement.

FIG. 8 is a diagrammatic end elevation of a wedge-form crop stripping element 1 which has a reduced-width mounting flange. It is secured by a bolt 10 to a section of a zig-zag bracket arrangement 8, which forms part of a transverse mounting strip 91. The surface of the moveable support means 32 is provided at intervals on opposite sides with guides 90 which are suitably cranked to allow a continuous length, or sections of, element mounting strip 91 to be inserted from the side, to be retained firmly in the operating position. Slots 92 allow transverse positioning of successive arrays of crop stripping elements and subsequent clamping by, for example, set bolts.

This arrangement allows rapid repair and replacement of elements as well as adaptation of the stripping device to different crops and conditions and, if desired, to the reverse direction of operation. Conveniently there may be made provision on the surface of the moveable support means 32 for accommodating different numbers of transverse arrays of stripping elements.

Conveniently, in place of the continuous zig-zag bracket arrangement there may be provided on the sliding mounting strip 91 individual retaining brackets of varying design, including channel-section brackets with outwardly extending parallel or converging flanges. Coverging-channel brackets may be blanked off at their trailing ends, so that each element may be positively secured by simple means at the leading open end, for example be deforming the side walls slightly.

Figure 9:
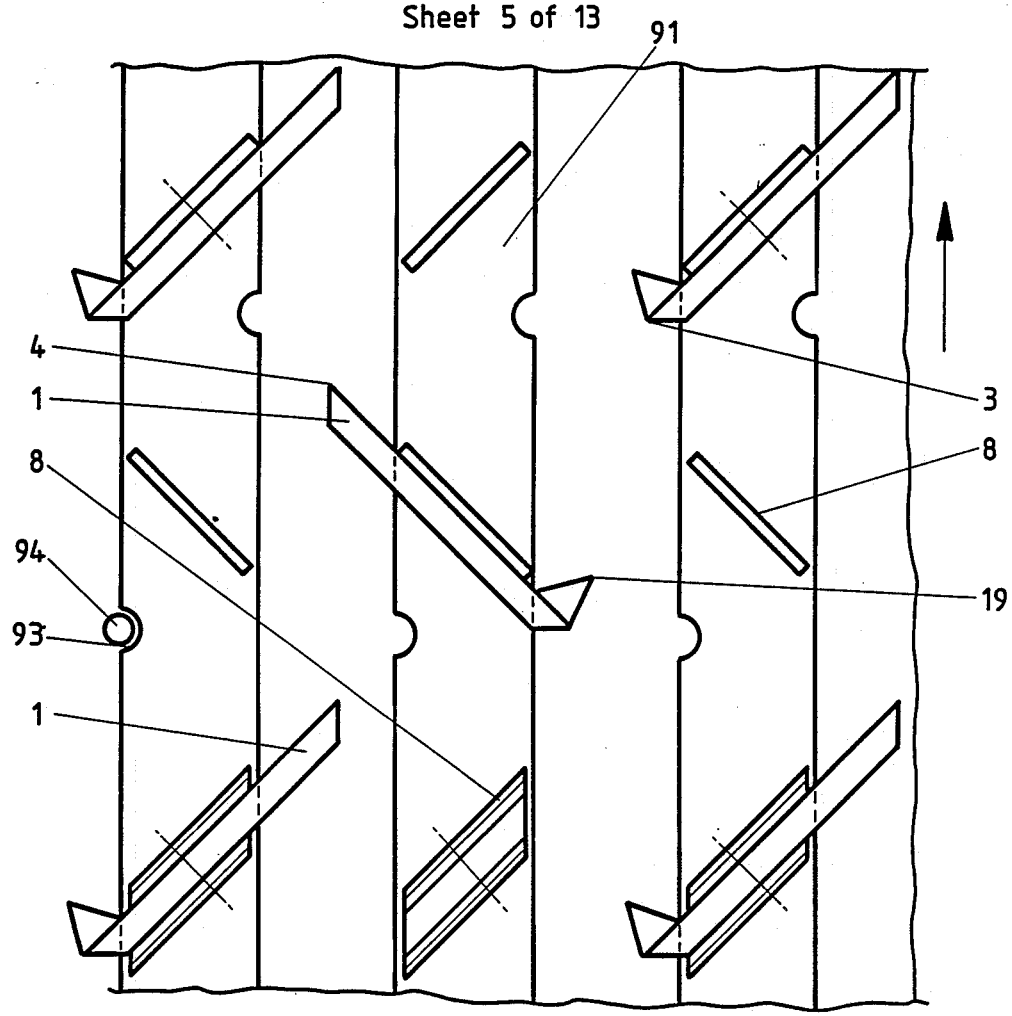
FIG. 9 shows in plan view a section of the development of the surface of a crop stripping rotor.

FIG. 9 shows in plan view a section of the development of the surface of a crop stripping rotor in which the bracket-carrying strips 91 are oriented to surround the moveable support means 32. Known means may be used to tension the straps 91, provided a distribution of mass is maintained around the rotor axis which takes account of the requirements for adequate dynamic balance. To prevent circumferential slip of the sliding straps 91, there may be provided recesses 93 in the straps to register with dowels 94. Other locating means may be employed.

Whilst in FIG. 9 the upper two transverse rows of brackets 8 for securing the elements 1 are simple cantilevered flanges, the lowermost row shows channel-type brackets with outwardly converging walls. Optionally other means and methods of attaching discrete crop stripping elements to moveable support means may be provided.

FIG. 9 also discloses possible patterns and densities of providing crop stripping elements on the moveable support means 32. Whilst every bracket station shown may be occupied by an element, in many crops and conditions a reduced number of elements is likely to give satisfactory performance.

As shown in FIG. 9, adjacent straps 91 are provided with inversely inclined wedge-form elements. Preferably the prominent leading edges should at least follow each other or overlap slightly in the direction of rotation. The trailing edges 3 between two circumferential arrays of inversely angled stripping elements may be laterally spaced apart, because the whiplash effect which is forced upon the crop by the inclined crop engaging surfaces of successive elements causes detachment of wanted plant parts, even though an intervening strip of the crop may not be physically swept or combed by any part of an element. The permissible lateral distance between trailing edges of inversely inclined elements also depends on the shape and profile of the trailing edges.

The means and method of attaching crop stripping elements to a rotor core, as disclosed in FIG. 9, have the important advantage that the lateral spacing between circumferential arrays of elements may be changed quickly and easily.

As an alternative to the arrangement of elements shown in FIG. 9, successive circumferential arrays may all be oriented in the same direction, for example in one half of the stripping rotor, whilst in the other half the orientation may be in the opposite direction. Preferably in operation the elements may be angled away from the ends of the rotor and towards the centre. In such an arrangement successive circumferential arrays of unidirectionally angled elements may also be spaced apart laterally, the margin depending on the length and other aspects of the crop.

In FIG. 9 the elements are shown to be attached to their brackets displaced to one side. This is one option and not a requirement to put the invention into effect.

Figures 10, 10A:
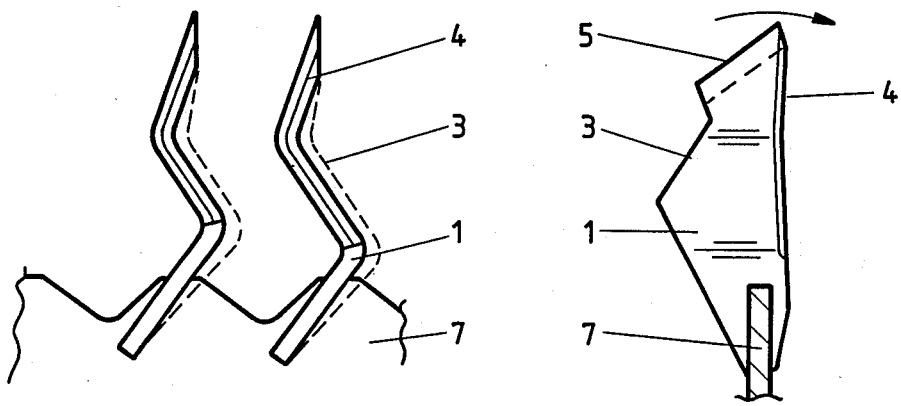
FIGS. 10 and 10a are respectively front and side elevations, partly in section, of fin-like crop stripping elements in which the prominent leading edge extends in more than one direction.

FIGS. 10 and 10a are respectively front and side elevations, partly in section, of fin-like crop stripping elements 1 in which the prominent leading edge 4 extends in more than one direction. As in the case of the elements shown in FIG. 2, the outer edge 5 is reclined and the inner regions are moulded or otherwise secured to transversely disposed serrated ribs 7.

The outer region of element 1 is angled less acutely to the direction of forward movement of the apparatus than the inner regions, and the tip region is chamfered, to promote entry into the crop with minimal adverse disturbance.

Preferably the thickness and flexiblity of the material from which elements 1 and ribs 7 are made are such that the elements are held in their operative positions at least in part by the centrifugal effect in operation of the apparatus. In conditions of overload or impact with foreign objects the elements 1 and ribs 7 may deflect laterally and rearwardly to escape damage.

Conveniently elements 1 may be secured to ribs 7 so that they are inclined laterally against the direction of movement, as indicated by the broken outlines in FIG. 10. Alternatively or additionally the elements may be tilted forwardly along their outwardly extending length so that the tip regions lead in the direction of movement of the elements.

Figure 11:
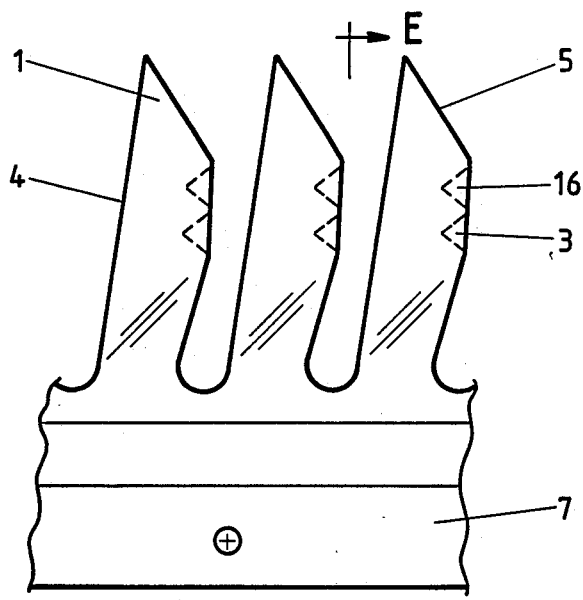
FIGS. 11 and 11a are respectively front and side elevations, partly in section, of fin-like crop stripping elements in which the crop facing surfaces lie in more than one plane.
Figure 11A:
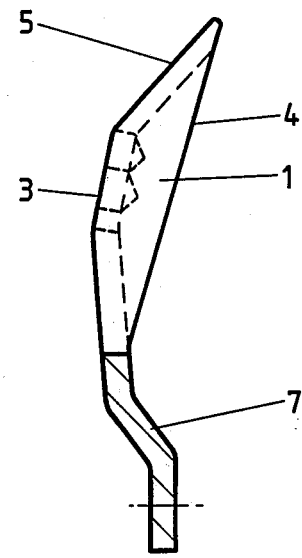

FIGS. 11 and 11a are respectively front and side elevations, partly in section, of fin-like crop stripping elements 1 in which the crop facing surfaces of the elements and of ribs 7 lie in more than one plane. In broken outlines it is indicated that the laterally offset trailing regions may be serrated optionally; such serrations may be provided also in other edge regions, notably in the region of prominent leading edge 4.

Perferably the elements are arranged in transverse arrays. Conveniently in circumferentially displaced arrays of elements the tips follow each other in the direction of movement or are marginally laterally displaced to form a helix. Ribs 7 may be moulded to take different forms, including forwardly inclined in the outward direction.

Figure 12:
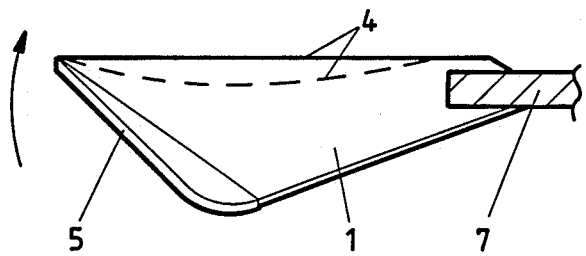
FIGS. 12 and 12a are respectively side and end elevations, partly in section, of a fin-like crop stripping element with laterally declined wings in the outer region.
Figure 12A:
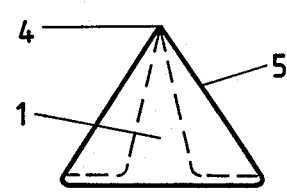

FIGS. 12 and 12a are respectively side and end elevations, partly in section, of a fin-like crop stripping element 1 provided in the outer region with laterally extending and rearwardly and inwardly trailing wings. In cross-section the fin is wedge-shaped as indicated in broken outline in FIG. 12a.

In side elevation prominent leading edge 4 may be concave, to provide a prominent tip region.

Preferably the wings bounded in the outer region by the edges 5 have crop facing surfaces which are laterally declined relative to the direction of movement of the elements. Alternatively the wings may extend laterally at different angles, including inclined angles relative to the central fin.

Conveniently transverse ribs 7 may be corrugated in the outward direction and elements 1 may extend outwardly from the ridges or from the depressions of the corrugations, or both.

Figure 13:
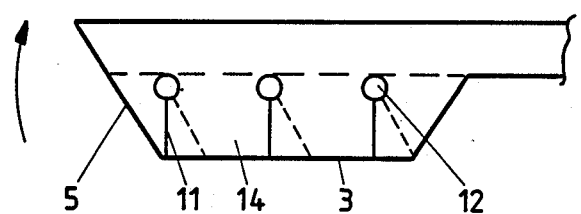
FIGS. 13 and 13a are respectively side and end elevations of a crop stripping element having a flexible, sectioned side region.
Figure 13A:
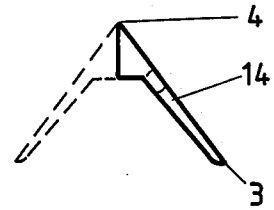

FIGS. 13 and 13a are respectively side and end elevations of a crop stripping element 1 having a flexible side region. Rearwards of prominent leading edge 4 is provided a strong spine from which extends laterally a declined surface comprising sufficiently thin flexible material that it allows preferential yielding to take place in response to increasing crop pressure and friction.

Preferably the flexible side regions are divided by lateral slits 11 so that each section forms a flap 14 which may yield independently. This may allow intrusion of stiff plant stems into the normal profile of the elements so that the stems become enveloped momentarily from the sides.

Conveniently the lateral slits 11 may terminate near the spine region in pre-formed holes 12, to minimise the risk of tearing and fatigue. The slits 11 may be provided at different angles, and the elements may be made symmetrical by the provision of a flexible region on both sides of the outwardly extending central spine.

FIG. 14 shows schematically the interactions between crop stems, seed heads and wedge-form crop stripping elements, as seen in plan view in a section of the development of the surface of a crop stripping device according to the invention. The elements 1 with prominent leading edge 4 flexible side regions on both sides of an outwardly extending spine. The staggered formation of the elements in and across the direction of movement relative to the 'tethered' crop induces lateral whiplash. This causes the heavy seed heads to be threshed by repeated impart with the leading and trailing edges and with the side regions of laterally and circumferentially adjacent elements.

Detached particles, particularly seeds, are impelled sideways, as seen, and in the general direction of movement of the elements.

In broken outline in FIG. 14 are indicated alternative crop stripping elements, as shown in FIGS. 15, 15a and 15b. These are respectively side and end elevations and plan view of an element 1 which has a prominent central leading edge 4 and reclined outer edges 5 which combine to split the crop apart. Following inwardly is a widening boat-shaped section which is recessed towards the centre against the direction of rotation and which is provided on each side with forwardly extending protrusions 19.

The element serves to detach, gather and retard-detached plant parts before impelling them outwardly for recovery. Protrusions 19 may be provided with recesses 16 and may extend forwardly and laterally at different inclinations.

Illustrated in FIG. 15 by way of example is a mounting arrangement 8 secured to the surface of moveable support means 32. The shaped resilient foot region 6 of element 1 is retained by the inwardly directed lip of one of the two flanges of mounting arrangement 8. The other flange supports the base region of the element from behind.

Element 1 may be fitted to mounting arrangement 8 by sliding it between the flanges from the sides or by prising the two flanges apart and springing the enlarged foot section into position. The heel of the foot section comprises a tapered ridge which is capable of deforming during insertion of the element and then extends to ensure correct and firm location in the mounting arrangement.

Figure 16:
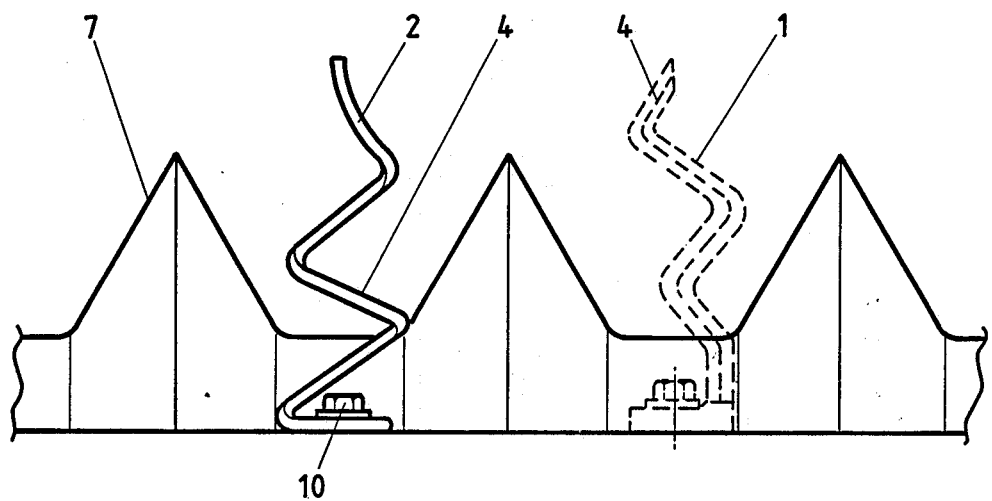
FIGS. 16 and 16a show in front elevation and plan view respectively a coil-shaped and fin-like crop stripping element alongside a circumferentially displaced corrugated fin-like crop stripping element, with interspersed serrated and corrugated transverse ribs.
Figure 16A:
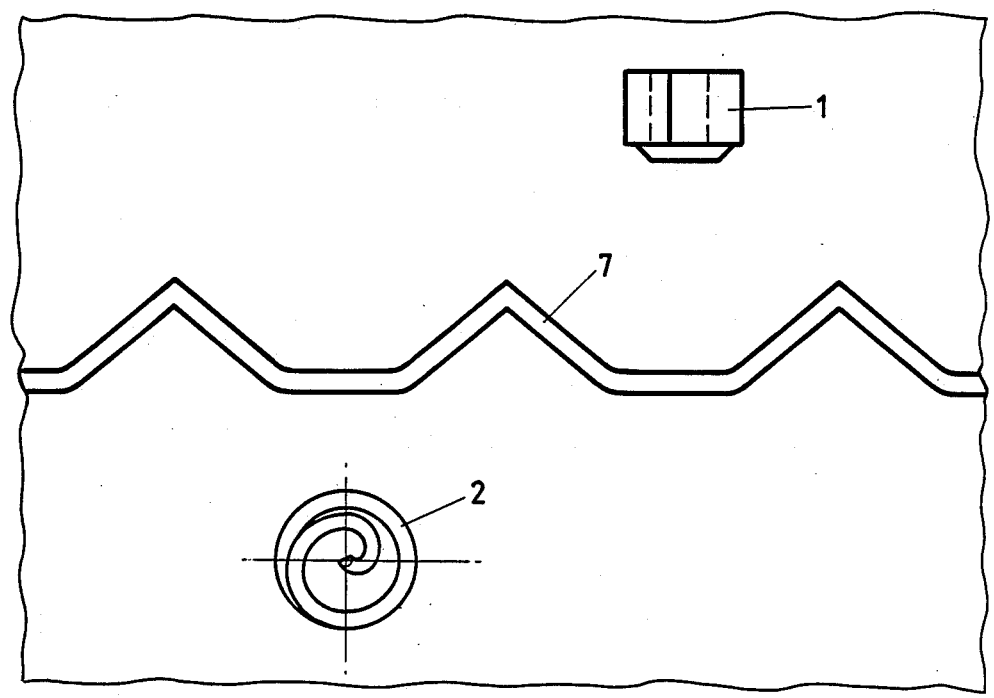

FIGS. 16 and 16a show in front elevation and plan view respectively a coil-shaped crop stripping element 2 alongside a circumferentially displaced corrugated rod- or fin-like crop stripping element 1. In the inward direction both elements provide crop stripping regions which are laterally offset relative to the tip region. The side edges of the protruding regions of corrugated transverse ribs 7 deflect crop laterally into the sphere of influence of elements 1 and 2.

Detached plant parts are collected and impelled for recovery by transverse ribs 7. Crop stripping elements 1 and 2 and ribs 7 may be transversely displayed in circumferential succession to form a helical pattern by which all detached particles are intercepted and redirected for recovery.

Conveniently elements 1 and 2 may be secured directly to the moveable support means 32 by mounting bolts 10.

The outwardly directed cone-shaped coil element 2 is fashioned from rod material which is semi-circular in cross-section. Conveniently material of other cross-sectional shapes may be used, including rectangular, triangular and circular.

FIG. 17 shows coil-shaped crop stripping elements 2 and interspersed serrated ribs 7. As previously, the elements shown in broken outline are implied to be offset circumferentially from elements shown in full outline. The transverse corrugated ribs 7 may be of different effective depth and spaced apart differently in the direction of movement of the stripping device.

When only coil-type and/or corrugated fin-like stripping elements are provided, it is preferred that there follows one transverse rib after 2 and 4 transverse arrays of elements and that the ribs extend outwardly to at least two-thirds of the effective length of the elements.

FIGS. 18, 18a and 18b show respectively front, side and end elevations of crop stripping elements 1 connected to serrated corrugated ribs 7. Each element 1 is shaped to provide 3 prominent leading edge regions 4 which are laterally and rearwardly displaced to each other. The elements are also shaped to provide regions which are laterally offset for stripping off forward facing wanted plant parts within or adjacent to the boundaries of the elements in operation.

The crop facing edges and surfaces of the elements and of the corrugated transverse ribs lie in several different planes, and there are provided additional edges in each element by the provision of a diamond-shaped aperture 16, to achieve in seed crops a maximum threshing effect.

At the outer, central prominent leading edge 4 of each element 1 the two outer halves may be separated and allowed to flex independently by the provision of a slit extending the short distance inwards from the tip to aperture 16.

At the junctions of elements 1 with corrugated ribs 7 the laterally recessed space may be shaped to provide more or less aggressive stripping, as indicated by the full and the broken outlines on one element in FIG. 18.

It will be noted that in the crop stripping elements illustrated in FIGS. 2 to 2c, 4 to 7b, 10 to 13 and 15 to 15b, prominent leading edge 4 is formed at the junction of two faces of the respective element which are inclined at an acute angle with respect to one another. If desired, of course, this feature may also be incorporated in crop stripping elements which are otherwise the same as any of the other forms of crop stripping element disclosed hereinbefore.

Figure 19:
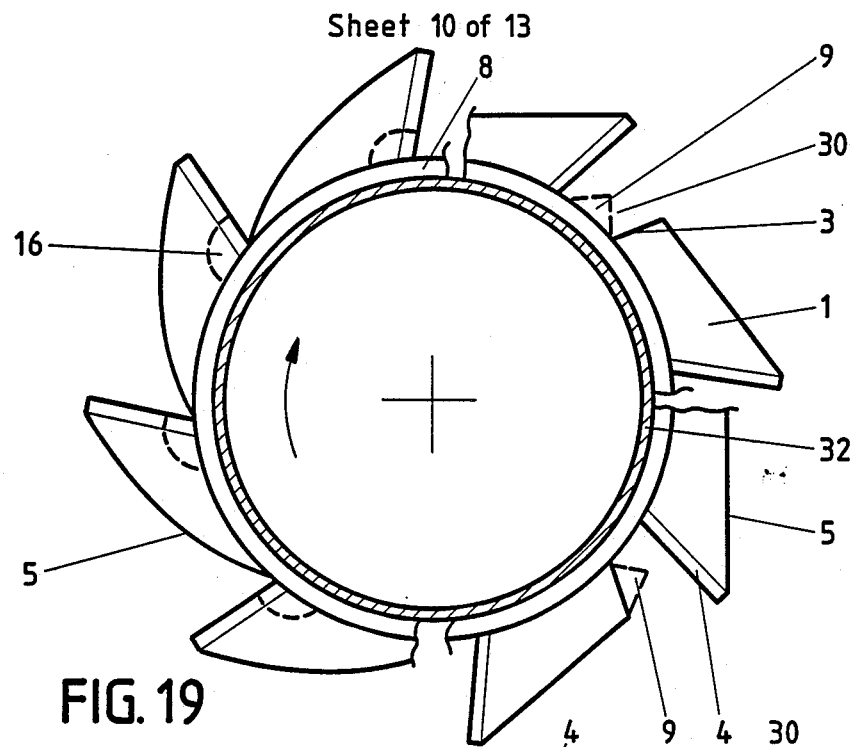
FIG. 19 is a cross-sectional view of a rotor on which the crop stripping elements are arranged in three helically disposed rows.

FIG. 19 is a cross-sectional view of a short section of a rotor on which the crop stripping elements 1 are arranged on the moveable support means 32 in three helically disposed rows. In each row the elements follow in helical succession in such a way that each of the prominent leading edges 4 is preferably forwardly inclined and the laterally extending surfaces taper rearwardly and inwardly towards the moveable support means.

In FIG. 19 elements 1 have sides bounded at the outer region by straight or curved reclined edges 5.

In operation of the helically arranged crop stripping elements crop stems come to be gathered across prominent leading edges 4 at an angle to the side regions, and detachment of wanted plant parts is achieved by the combined effects of the leading, outer and trailing edge regions. The stripping effect of rotor 30 may be enhanced by provision in the inner region of prominent leading edge 4 of recesses 16 or by the provision of protrusions 9 at the trailing edges of helically arranged elements 1 or between helically adjacent elements.

Conveniently the spirally arranged crop stripping elements may be formed of sheet-like resilient material in strips which may be moulded or mounted so that the outer regions of the elements are laterally offset relative to the mounting region. A momentary scooping effect is obtained if the lateral offset is in the direction of movement of the elements.

Figure 19A:
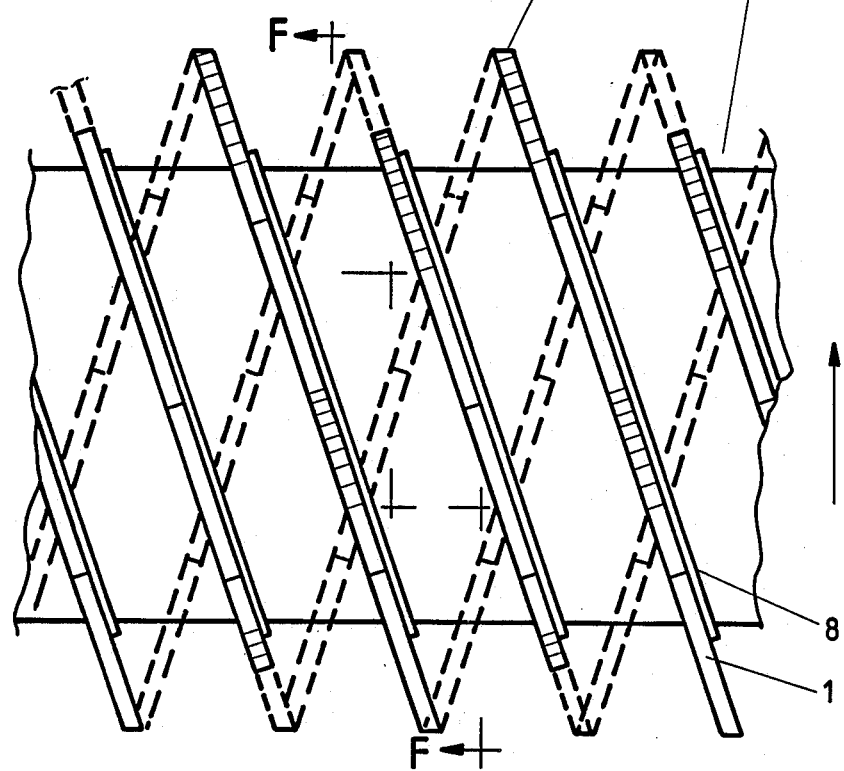
FIG. 19a is a diagrammatic front elevation of a stripping rotor having the crop stripping elements arranged in a three-start helix.

FIG. 19a is a diagrammatic front elevation of a stripping rotor 30 on which the crop stripping elements 1 are arranged in a three-start helix. A section in the direction of arrows FF is represented by FIG. 19.

Figure 20:
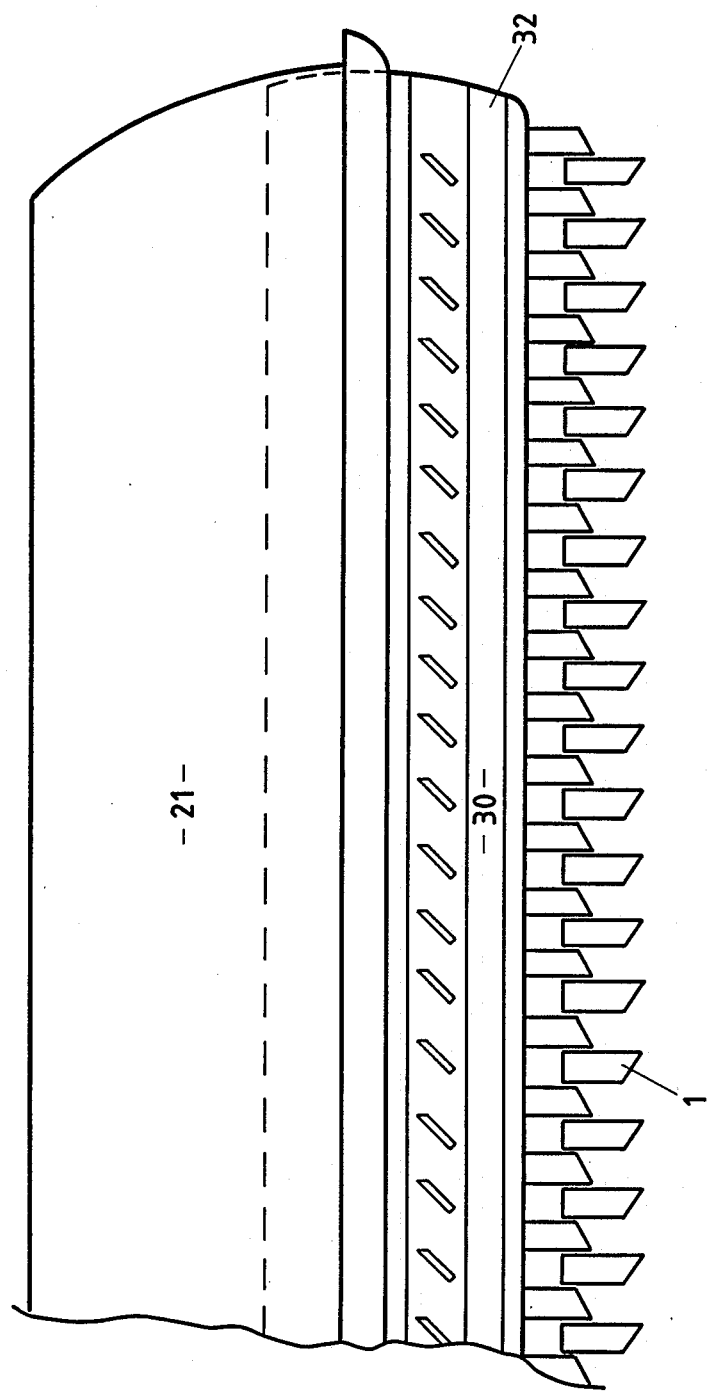
FIG. 20 is a perspective front elevation of a crop stripping rotor and its crop guide cover embodying the invetion.

FIG. 20 is a perspective front elevation of a crop stripping rotor 30 and its crop guide cover 21. Crop engaging elements 1 are laterally reclined, trapezoidal elements, generally as shown in FIGS. 4 to 9.

Figure 21:
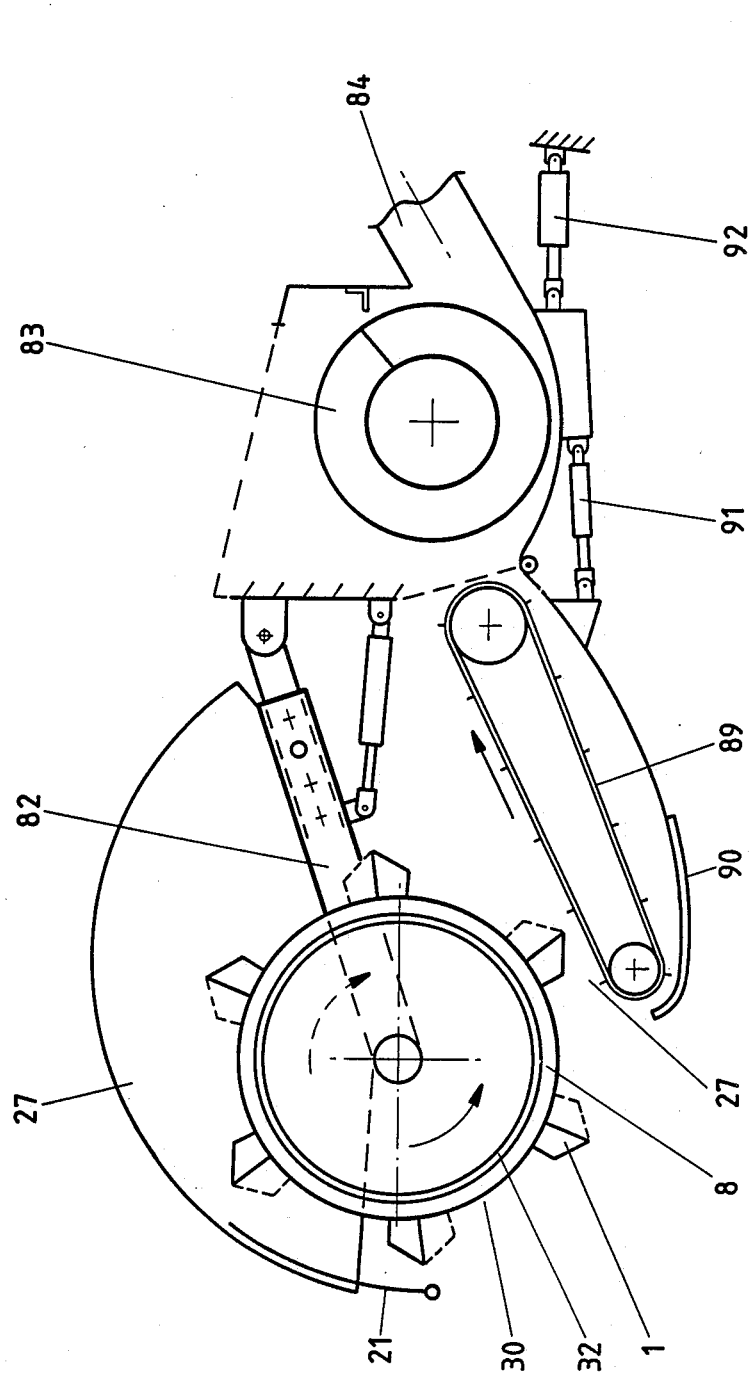
FIG. 21 is a diagrammatic cross-sectional side elevation of the header of a harvester embodying the invention.

FIG. 21 is a diagrammatic cross-sectional side elevation of the header of a harvester embodying the invention. The crop stripping rotor 30, comprising the moveable support means 32 and wedge-form elements 1, is supported on each side by a hydraulically pivotable arm 82, to which is attached also crop guide cover 21.

As shown in solid outline, the elements 1 of crop stripping device 30 may be rotated in the undershot mode; the adjustable front portion of crop guide cover 21 then shields the crop from premature contact with the elements. Detached crop parts are delivered into the lower crop flow passage 27 and thence on to crop conveyor 89. The conveyor discharges the collected material into a trough, for the auger 83 to move the material laterally and deliver it at one end or in the centre through a feed duct 84 for further processing or collection.

The rotor support arms 82 are telescopic and may be shortened or lengthened by separate hydraulic means or more simply, as shown, with the aid of a locking pin which may be located in alternative aligned holes. Thus, to recover severely laid crops, the rotor and its cover may be pushed forward and lowered to reach closer to the ground.

To be complementary to the height setting and fore-and-aft position of rotor 30, conveyor 89 may be angled appropriately by means of hydraulic ram 91. An interconnecting linkage or other means may be provided to prevent contact of rotor 30 with conveyor 89. A skid 90 at the front of the housing under conveyor 89 prevents damage to the conveyor due to ground contact. The operating height of the whole header may be adjusted by means of hydraulic ram 92.

The undershot mode of operation is particularly suitable for harvesting seeds from short crops with a large-diameter rotor. For operation in the overshot mode the stripping elements 1 are oriented as shown in broken outline. Detached crop is delivered into, and passes through, the upper crop flow passage 27 and is then guided by cover 21 in the general direction of crop conveyor 89 and auger 83.

Conveniently, the header shown in FIG. 21 may replace the conventional header of a combine-harvester or may be provided simply with means for conveying the collected material into a container or trailer.

FIG. 22 is a diagrammatic cross-sectional side elevation of a harvesting apparatus embodying the invention, generally in the form of a tractor-mounted device. In the front region there is shown to be provided seed stripping apparatus 30 comprising moveable support means 32 and crop engaging elements 1.

The material removed from the crop by the stripping device 30 is prevented from being scattered by the upper crop guide cover 21, which is preferably smoothly curved and extends from in front of the seed stripping region rearwards over the whole apparatus.

The unobstructed space beneath the cover 21 serves as a crop flow passage 27. On reaching this passage, the crop parts of directed towards the separating apparatus. To assist the passage of material and, if necessary, induce directional changes or prevent crop accumulations, auxiliary crop conveying means may be provided, where required.

The rotor 28 shown between the seed stripping device 30 and the separating apparatus may be positioned higher or lower, be driven in either direction and may take the alternative forms of a plain or profiled roller or of a short continuous belt conveyor. Auxiliary crop conveying means may be provided in alternative positions, for example above the front half or the centre of stripping device 30.

As a first step towards the separation of seeds and other small fractions from the coarse material detached by the seed stripping means, there may be provided cantilevered downwardly and rearwardly from the crop guide cover 21 a transverse array of spaced-apart static fins 40 to divide off the rear part of the crop flow passage 27 between the crop guide cover 21 and a transverse auger conveyor 42. Above this conveyor and behind the coarse crop deflecting fins 40 is positioned a driven shaft carrying thin discs so spaced that they divide equally the spaces between the fins 40.

Preferably the discs are provided on their peripheries with spaced recesses to enhance their conveying capacity.

The combination of spaced fins 40 and downwardly rotating discs 41 facing the crop stream results in efficient separation from coarse material of small particles, without blockages occurring, even in the presence of large quantities of crop bulk. Separated small fractions which have passed between the fins 40 and discs 41 are collected in the trough beneath the auger 42 and are conveyed sideways for subsequent cleaning and combining with other seed separated later.

The coarse material, which usually contains some seed heads requiring further threshing, next enters the main part of the transversely arranged and driven separating apparatus indicated generally at 50.

At the uppermost level there may be provided optionally a transverse belt conveyor 51 which feeds the material to one side of the apparatus. Details of the main separating apparatus 50 are shown in greater detail in FIG. 22b which is a cross-sectional view generally in the direction of arrows GG in FIG. 22.

In FIG. 22b the belt conveyor 51, which may be cleated, is shown to move the material to be threshed from right to left towards the feed end of a multiple-drum threshing apparatus 53 beneath. A feed beater 52 force-feeds the coarse material downwards in front of the first threshing drum of the threshing apparatus 53, for it to be drawn under the first and subsequent, co-rotating drums for threshing in co-operation with an open-grate concave 54 of generally known form beneath each drum.

To the left and forward of the first drum of the threshing apparatus 50 there is provided a recessed stone trap 55 into which fall, or are propelled by the beaters of the first drum, heavy objects which may have been entrained in the crop stream. The drums of the threshing apparatus 50 may take different forms. They may have mounted across their width conventional rasp-type threshing bars, or more aggressive studs or pegs, or less aggressive plain or profiled ribs.

Although five successive threshing drums are shown, followed by a stripper beater in the exit region of the threshing apparatus 50, there may be needed for some crops and conditions fewer drums and concaves, the minimum being one threshing drum and one stripper beater.

As shown, the open-grate concaves 54 are individually and adjustably pivoted at their entrance regions and are preferably supported on resilient springs under the exit region. Alternatively, the concaves may be mounted in a common frame structure provided with height adjusting means, at least at the corners, to vary the clearance above and hence the severity of the threshing process.

Beneath the open-grate concaves 54 of the threshing apparatus 50 may be provided an open-mesh conveyor 56 having a multiplicity of apertures so dimensioned that seeds are able to pass through readily, but coarse material is retained on top.

To enhance the separating effect of conveyor 56, there may be provided under the upper portion of the conveyor a series of driven or freely rotating agitators 57, causing the upper run of the conveyor to rise and fall abruptly at intervals of time.

As indicated by the direction arrow over the separating conveyor 56 in FIG. 22b, coarse material is conveyed to the right to be deposited on the ground. If fewer than a full-width arrangement of threshing drums and concaves are provided, the upper run of separating conveyor 56 is capable of transporting away the threshed material.

Seeds which fall through the upper run of conveyor 56 also pass through the lower run and are conveyed to the left by transverse slats or ribs acting as scrapers on the solid floor 58. The seeds are transferred into a rearwardly moving conveyor 59, preferably an auger conveyor. Optionally there may be provided at either end or both ends of conveyor 56 a counter-rotating brush or other effective device (not shown) for cleaning the conveyor off any material which may tend to adhere to it.

The seed with impurities collected in the auger conveyor 42 is also moved to the left towards a space 60, where it may be spread by a suitably shaped scatter plate 61, so that it falls through the space loosely distributed. Air entering through louvres 64 and blown by a fan 62 through an outlet 63 with adjustable baffle and directional flow control may be directed through the falling seed stream, to remove light unwanted fractions which are directed on to the ground by deflector 65 alongside the tractor 26.

The thus winnowed seed falls into the rear section of lower auger conveyor 59 from where it may be elevated, as shown in FIG. 22, by a conveyor 66 into a trailer 67 which may have self-unloading facility and may be pulled behind the tractor 26.

FIG. 22a shows in a cross-sectional side elevation of alternative crop stripping device to the single rotor shown in FIG. 22. The seed stripping apparatus 30 comprises moveable support means 32, consisting of a continuous belt supported by rollers 35 and 36, and crop stripping elements 1.

It is preferred that the upper roller 36 is driven and that it is positioned vertically above or forward of lower roller 35. This arrangement has the advantage that in normal crop conditions the seed bearing heads are engaged by stripping elements 1 before the lower stem regions, and thus shedding losses often caused by vibration of the stems are minimised. A further advantage particularly of the fowardly inclined stripping device 30 is that the friction forces applied to the plants are low.

Conveniently there may be provided on the driven underside of flexible support means 32 teeth or toothed belts, at least near the sides, to register with toothed wheels or pulleys on at least one of the supporting rollers which provides the drive.

In front of the upper part of seed stripping device 30 is shown an optional additional rotor 39, which is shielded in the front region by a hood 40 against premature contact with the crop. Additional rotor 39 may be adjustable vertically and horizontally relative to the primary stripping device 30. Rotor 39 may be driven at peripheral speeds suitable for stripping wanted plant parts from the forward facing crop regions, particularly from seed heads; it also serves to re-direct into recovery trajectories seeds which may be propelled against it by the principal stripping device 30 and to assist the feeding of crop into the principal stripping device, especially when the crop is tangled or lodged.

For stripping forward facing plant regions the additional rotor 39 may be provided with simple transversely or helically arranged serrated or otherwise recessed ribs or with arrays of crop stripping elements of the present invention.

In an alternative embodiment the additional rotor 39 may be studded on its core surface with tough but relatively soft elongate protrusions which may taper towards their tips and may be circular or oblong in cross-section. The protrusions serve to remove seeds and to lift crop by a flailing action.

Preferably an adjustment may be provided of the extent to which rotor 39 is encircled at the front by hood 21, so that contact between the crop and rotor may be advanced or retarded.

Conveniently, the harvesting apparatus described in the foregoing may be used with all or any of the separating components, depending on the degree of separation it is required to achieve. In some instances as clean a seed sample as possible may be demanded, whilst in others only the coarsest non-seed fraction is to be removed.

The seed stripping apparatus may be used without provision for additional cleaning, for example when all the detached material may be needed for grinding up as a livestock feed. In that event any of the different known forms of crop collecting device may be combined with the seed stripping part of the apparatus.

There will now be considered the important dimensions and general arrangements which are appropriate for the effective operation of the embodiments of the invention. The requirements of different seed crops may vary appreciably, depending on seed size, stem thickness, crop maturity and growth habit.

For dwarf crops having low seed or fruiting bodies the minimum ground clearance under the tip envelope of the seed stripping device may be 25 mm, and the effective radius of the stripping rotor preferably may be no greater than 200 mm. A small tip radius is most readily provided by the vertical or forwardly inclined continuous-belt type stripping apparatus, but in short crops stripping rotors of small diameter also perform satisfactorily without wrapping.

For the most commonly grown crops, particularly cereal and pulse crops, the effective length of the crop stripping elements is preferably 40–160 mm, most preferably 50–80 mm. The overall length range of the elements for all types of crop may include 20 and 240 mm. Conveniently the crop stripping elements may have different tip radii as a result of extending outwards from the moveable support means for different distances, and transverse and/or circumferential arrays of crop stripping elements may comprise different types of element.

Conveniently the effective width of wedge-form crop stripping elements may vary between 20 and around 200 mm, preferably between 35 and 100 mm. The material from which rod- and fin-like crop stripping elements are made may have thickness dimensions which include conveniently 5 and 20 mm.

Preferably the depth of fin-like crop stripping elements in the direction of movement may vary between 6 and 60 mm.

Preferably the lateral inclination of the principal plane of the crop engaging surface of wedge-form crop stripping elements is 10 to 65° relative to a plane perpendicular to the transverse rotor axis.

The reclined angle the outer edge of an element makes with a transverse radial plane passing through the tip of the element is preferably at least 10°, more preferably 10° to 20° and most preferably 30° or more.

Conveniently the maximum effective radius of seed stripping rotors for the majority of crops in temperate climates may be around 500 mm, and the maximum effective length of a continuous belt-type seed stripping device 1200 mm. The preferred effective radius of a crop stripping rotor for general purpose use ranges between 200 and 300 mm.

Conveniently the tip speeds of the crop engaging elements on a crop stripping rotor or belt may vary between 8 and 40 m/s, the preferred range being 12–24 m/s, and the most preferred 15–22 m/s.

Conveniently the effective radius of threshing drums used in transversely arranged multiples may vary according to the principal crops to be harvested between 180 and 250 mm, and the radius of an axial threshing rotor may vary between 200 and 500 mm.

In conformity with established practice and the requirements for different crops, the peripheral speeds of threshing and beating drums may vary widely according to crop type and seed size and maturity.

Conveniently the fore-and-aft length of each threshing and beating drum may be 1000–2000 mm, preferably 1400 mm, and the transverse length of an axial threshing rotor may be 2000–5000 mm.

I claim:

1. Apparatus for harvesting crops comprising:
   a mobile support structure for movement over the ground;
   movable support means extending transversely across the direction of forward movement of the apparatus;
   a plurality of crop engaging elements secured to the movable support means and cantilevered therefrom to extend longitudinally outwardly from said support means;
   means mounting said movable support means for movement, relative to said support structure, such as to cause said crop engaging elements to comb through a naturally disposed uncut crop into which the mobile support structure is moved;

at least some of the crop engaging elements comprising crop stripping elements, each having, at least in an outer region thereof, a form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;

means for imparting said movement to the movable support means; and crop guide means extending over or under the apparatus, whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

2. Apparatus according to claim 1, in which the crop engaging elements are shaped so as to impel detached crop parts into paths which are directed substantially laterally and/or inwardly at a front region.

3. Apparatus according to claim 1, in which an outwardly extending crop facing surface lies in two or more planes.

4. Apparatus according to claim 1, in which in at least one said crop stripping elements, the surface thereof which defines said wedge and includes said leading edge is additionally grooved, ribbed or otherwise contoured.

5. Apparatus according to claim 1, in which the trailing edge regions are provided with forwardly directed protrusions.

6. Apparatus according to claim 1, in which the leading edge regions of outwardly extending elements comprising fins or rods are acutely laterally inclined in one direction or more to the transverse axis of the stripping device.

7. Apparatus according to claim 6, in which the outwardly extending fins have trailing regions comprising lateral protrusions.

8. Apparatus according to claim 1, in which crop engaging elements are shaped and oriented to form regions which are inwardly, laterally, and rearwardly offset relative to the tips of the elements for stripping wanted plant parts off the forward facing crop regions when crop intrudes into the offset regions.

9. Apparatus according to claim 1, in which the prominent leading edge in the outer region of a crop stripping element is followed inwardly by a depression in the crop engaging surface between the side regions of the element.

10. Apparatus according to claim 1, in which the crop facing surface or surfaces of a crop engaging element is/are perforated.

11. Apparatus according to claim 1, in which acutely reclined side regions of circumferentially spaced but laterally adjacent crop stripping elements overlap in the direction of movement of the elements.

12. Apparatus according to claim 1, in which the crop stripping elements have outer edge regions which are laterally offset from the mounting regions.

13. Apparatus according to claim 1, in which the trailing and leading edge regions of a laterally and circumferentially disposed element are adapted, by the provision of recesses and/or protrusions, to enhance the stripping effect.

14. Apparatus according to claim 1, in which the outer edge regions of crop stripping elements are laterally and inwardly curved.

15. Apparatus according to claim 1, in which the inner mounting region of crop engaging elements is enlarged to form a broadened foot region which is shaped to be sprung by inwardly directed force into guides providing a self-locking fit.

16. Apparatus according to claim 1, in which the movable support means comprises a continuous transverse belt from which the crop engaging elements are cantilevered outwardly and the front region of which is forwardly inclined.

17. Apparatus according to claim 1, in which there is provided in front of and in proximity with the principal seed stripping means an additional rotor, shielded at the front against premature crop contact, which is adapted for stripping seeds off the forward facing parts of seed heads.

18. Apparatus according to claim 17, in which the rotor has a core member densely populated with flexible elongate projections to provide a flailing effect.

19. Apparatus for harvesting crops comprising:

a mobile support structure for movement over the ground;

movable support means extending transversely across the direction of forward movement of the apparatus;

a plurality of crop engaging elements secured to the movable support means and cantilevered therefrom to extend longitudinally outwardly from said support means;

means mounting said movable support means for movement, relative to said support stucture, such as to cause said crop engaging elements to comb through a naturally disposed uncut crop into which the mobile support structure is moved;

at least some of the crop engaging elements comprising crop stripping elements, each having, at least in an outer region thereof, a form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;

each of said crop stripping elements comprising at least one outwardly extending crop facing surface which is bounded in its crop engaging region by a prominent leading edge, a trailing edge and an intermediate outer edge;

means for imparting said movement to the movable support means; and crop guide means extending over or under the apparatus whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

20. Apparatus according to claim 19, in which the outer edge region is provided at least for part of its length with a crop-facing ridge.

21. Apparatus according to claim 19, in which the trailing edge regions are profiled in stepped or recessed form.

22. Apparatus for harvesting crops comprising:
a mobile support structure for movement over the ground;
movable support means extending transversely across the direction of forward movement of the apparatus;
a plurality of crop engaging elements secured to the movable support means and cantilevered therefrom to extend longitudinally outwardly from said support means;
means mounting said movable support means for movement, relative to said support structure, such as to cause said crop engaging elements to comb through a naturally disposed uncut crop into which the mobile support structure is moved;
at least some of the crop engaging elements comprising crop stripping elements, each having, at least in an outer region thereof, a form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;
said crop stripping elements have differing stiffness across their effective width, so that in operation flexible trailing side regions may yield into reclined positions in response to increasing crop pressure and friction;
means for imparting said movement to the movable support means; and
crop guide means extending over or under the apparatus, whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

23. Apparatus according to claim 22, in which the flexible side regions are divided into a series of flaps so that plant stems may be enveloped from the sides by the sides regions for efficient stripping of wanted plant parts.

24. Apparatus for harvesting crops comprising:
a mobile support structure for movement over the ground;
movable support means extending transversely across the direction of forward movement of the apparatus;
a plurality of crop engaging elements secured to the movable support means and cantilevered therefrom to extend longitudinally outwardly from said support means;
means mounting said movable support means for movement, relative to said support structure, such as to cause said crop engaging elements to comb through a naturally disposed uncut crop into which the mobile support structure is moved;
at least some of the crop engaging elements comprising crop stripping elements, each having, at least in an outer region thereof, a form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;
additional transverse ribs having a serrated or otherwise profiled leading edge, to cooperate with the crop stripping elements;
means for imparting said movement to the movable support means; and
crop guide means extending over or under the apparatus, whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

25. Apparatus according to claim 24, in which the transverse ribs are corrugated or folded in the outward direction.

26. Apparatus according to claim 24, in which the crop stripping elements form outwardly extending integral or separate extensions of a transverse rib and have connecting regions which lie in a plane different from the supporting plane of the rib.

27. Apparatus for harvesting crops comprising:
a mobile support structure for movement over the ground;
movable support means extending transversely across the direction of forward movement of the apparatus;
a plurality of crop engaging elements secured to the movable support means and cantilevered therefrom to extend longitudinally outwardly from said support means;
means mounting said movable support means for movement, relative to said support structure, such as to cause said crop engaging elements to comb through a naturally disposed uncut crop into which the mobile support structure is moved;
at least some of the crop engaging elements comprising crop stripping elements, each having, at least in an outer region thereof, a form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;

said crop engaging elements integral with, or mounted on, moveable strips disposed circumferentially around the movable support means, to permit lateral adjustment of the position of the elements and reversal of their lateral inclination;

means for imparting said movement to the movable support means; and crop guide means extending over or under the apparatus, whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

28. A method of harvesting a crop comprising:

providing an apparatus for harvesting crops comprising:

a mobile support structure for movement over the ground;

movable support means extending transversely across the direction of forward movement of the apparatus;

a plurality of crop engaging elements secured to the movable support means and cantilevered therefrom to extend longitudinally outwardly from said support means;

means mounting said movable support means for movement, relative to said support stucture, such as to cause said crop engaging elements to comb through a naturally disposed uncut crop into which the mobile support structure is moved;

at least some of the crop engaging elements comprising crop stripping elements, each having, at least in an outer region thereof, form which, in section through the element substantially perpendicular to the direction of longitudinal extent of the element, presents the configuration of an acutely tapered wedge pointing in the direction of movement of the element consequent upon said movement of the movable support means whereby the crop stripping element presents a narrow leading edge facing in the direction of movement of the element during such movement of the movable support means;

means for imparting said movement to the movable support means; and crop guide means extending over or under the apparatus, whereby, in operation as the apparatus is advanced through a standing, naturally disposed uncut crop, and the movable support means is moved by said driving means, the crop stripping elements will comb through the crop to split the crop mass apart and detach and recover wanted plant parts and the crop guide means will prevent detached wanted crop parts from becoming lost and will direct them rearward for collection.

moving through the uncut crop said apparatus;

driving said movable support means so that said crop engaging elements comb through the naturally disposed crop at a front region of the apparatus, whereby said crop stripping elements form acutely beveled wedges effective in the direction defined by rotation of the elements around the transverse axis of the support means and movement of the apparatus through the crop, to split the crop mass apart and to detach wanted parts from the plants, and impelling detached crop parts substantially laterally and rearwardly towards a collection facility.

29. A method according to claim 28, comprising impelling the detached crop parts towards the said collection facility at least in part by the action of profiled and/or folded transverse ribs provided on said movable support means.

30. A method according to claim 28, wherein at least some of said crop engaging elements have lateral wings or protrusions and beating the seed heads with said laterally extending wings or protrusions, so that said seed is detached from the seed heads.

31. A method according to claim 28, comprising detaching said seeds from forward-facing parts of seed-bearing heads by the effect of impacts directed by separate means on the seed heads in a direction counter to the direction of forward movement of the apparatus.

32. A method according to claim 28, wherein at least some of said crop stripping elements are flexible; and parting the seed-bearing stems of the crop and detaching said seeds from the seed heads, by a flailing effect of said crop stripping elements.

* * * * *